US010654344B2

(12) United States Patent  
Mathiasen et al.

(10) Patent No.: US 10,654,344 B2  
(45) Date of Patent: May 19, 2020

(54) MOTORIZED DOORS AND RELATED METHODS

(71) Applicant: Girard Guard, LLC, San Clemente, CA (US)

(72) Inventors: Johnnie Mathiasen, San Clemente, CA (US); Oscar Solis Marquez, San Clemente, CA (US)

(73) Assignee: Girard Guard, LLC, San Clemente, CA (US)

( * ) Notice: Subject to any disclaimer, the term of this patent is extended or adjusted under 35 U.S.C. 154(b) by 176 days.

(21) Appl. No.: 15/780,546

(22) PCT Filed: Dec. 1, 2016

(86) PCT No.: PCT/US2016/064465  
§ 371 (c)(1),  
(2) Date: May 31, 2018

(87) PCT Pub. No.: WO2017/096070  
PCT Pub. Date: Jun. 8, 2017

(65) Prior Publication Data  
US 2018/0355653 A1  Dec. 13, 2018

Related U.S. Application Data

(60) Provisional application No. 62/261,677, filed on Dec. 1, 2015.

(51) Int. Cl.  
*B60J 5/04* (2006.01)  
*E05F 15/63* (2015.01)  
*E05F 15/60* (2015.01)  
*E05F 15/603* (2015.01)  
*E05F 15/616* (2015.01)  
*H04N 5/64* (2006.01)  
*E05F 15/43* (2015.01)

(52) U.S. Cl.  
CPC ............ *B60J 5/0491* (2013.01); *E05F 15/60* (2015.01); *E05F 15/603* (2015.01);  
(Continued)

(58) Field of Classification Search  
CPC ... E05F 15/63; E05F 2015/631; E05F 15/616; B60J 5/0491; F16M 11/10; F16M 11/18; F16M 13/02  
(Continued)

(56) References Cited

U.S. PATENT DOCUMENTS 2,924,449 A * 2/1960 Leimer ................... E05F 15/63  
49/139  
2,973,221 A * 2/1961 Blackman .............. B60J 7/1642  
296/146.4

(Continued)

OTHER PUBLICATIONS

International Search Report and Written Opinion on corresponding PCT application (PCT/US2016/064465) from International Searching Authority (US) dated Feb. 21, 2017.

*Primary Examiner* — Jason S Morrow  
(74) *Attorney, Agent, or Firm* — Klein, O'Neill & Singh, LLP

(57) ABSTRACT

A motorized door assembly for a vehicle includes a housing having a housing body, a housing opening extending into a housing cavity, a door coupled to the housing and rotatable with respect to the housing about a pivot axis, a motor with a motor head fixed to the housing and a motor adapter rotatably coupled to the motor head about a rotation axis that is different than the pivot axis, and an arm coupled to the door and the motor. The housing cavity secures a component therein. The door conceals the housing cavity in a door closed position and reveals the housing cavity in a door open position.

15 Claims, 8 Drawing Sheets

(52) U.S. Cl.
CPC .......... *E05F 15/616* (2015.01); *E05F 15/63* (2015.01); *E05F 15/43* (2015.01); *E05F 2015/631* (2015.01); *E05Y 2900/512* (2013.01); *H04N 5/64* (2013.01)

(58) Field of Classification Search
USPC ...................................................... 296/146.4
See application file for complete search history.

(56) References Cited

U.S. PATENT DOCUMENTS

| | | | |
|---|---|---|---|
| 3,683,453 A | | 8/1972 | McLeland et al. |
| 5,887,317 A | | 3/1999 | Baker |
| 6,138,412 A | * | 10/2000 | Rieckmann ............ E05F 15/53 |
| | | | 49/340 |
| 6,357,813 B1 | | 3/2002 | Vandeberghe et al. |
| 6,416,027 B1 | | 7/2002 | Hart |
| 2002/0074959 A1 | | 6/2002 | Van Wiemeersch |
| 2005/0150078 A1 | * | 7/2005 | Bittner ................... E05D 5/062 |
| | | | 16/221 |
| 2006/0006686 A1 | | 1/2006 | Schmeichel |
| 2006/0082186 A1 | * | 4/2006 | Bals ...................... E05F 15/614 |
| | | | 296/146.1 |
| 2006/0137248 A1 | * | 6/2006 | Ichinose ............... E05F 15/611 |
| | | | 49/340 |
| 2008/0168714 A1 | * | 7/2008 | Watanabe ............... E05F 15/63 |
| | | | 49/349 |
| 2016/0123053 A1 | * | 5/2016 | Martin ...................... E06B 3/34 |
| | | | 49/398 |

* cited by examiner

MOTORIZED DOORS AND RELATED METHODS

FIELD OF ART

The disclosed invention generally relates to motorized doors and more specifically directed to motorized doors for vehicles and related methods to cover or shelter electronics, such as entertainment components and systems, for use with vehicles, such as recreational vehicles, buses, vehicles used for businesses, or utility vehicles. Utility vehicles can include ambulances, fire trucks, and military vehicles.

BACKGROUND

Vehicles are equipped with many features and amenities to provide convenience and enjoyment for both drivers and passengers. Some of these features include electronic components, such as radios, video players, viewing monitors, and cooking appliances. When not in use, these components may be unsightly or obtrusive. Furthermore, the electronic components are subject to environmental conditions such as moisture and debris if located outside of the vehicle.

SUMMARY

Aspects of the present disclosure include a motorized door assembly configured to be assembled to a vehicle. The vehicle can be a recreational vehicle or a trailer. The motorized door assembly can be configured to conceal one or more components, such as a television monitor and/or speakers or other entertainment components or systems, behind a door, which can be moved to open/close by a remotely operated motor to expose or cover the one or more components.

The motorized door assembly can be configured to open by rotating the door outwardly to expose and reveal the components directly mounted to the vehicle, and close to cover the components from view. In one example, the door can pivot along an edge and the free edge of the door can be rotated outwardly to expose opening of the housing assembly and the components to the environment.

The motorized door assembly can comprise a door seated with a frame, which can be installed on to the skin or panel along the exterior of the vehicle in a receiving cavity with both the frame and the door generally flush with an outer surface of the vehicle when the door is in the closed position to present a smooth appearance.

In another example, the frame and/or the door are not flush-mounted to the panel and may protrude outwardly from the outer surface of the vehicle.

In yet another example, the frame and the door may be slightly recessed from the outer surface of the vehicle.

The motorized door assembly can be located outside the vehicle and at least part of the door and the frame can be exposed to the environment but can alternatively be mounted inside the vehicle.

In some examples, the motorized door assembly can be mounted to a different exterior section of the vehicle, such as to the rear panel or to an opposing side panel.

The motorized door assembly can be in the closed position away or apart from the vehicle.

The motorized door assembly can comprises a housing, which can have any number of different shapes with rectangle being more optimum, a frame attached to the housing, and a door attached to the frame. The frame is part of the housing.

The housing can be used to drop into a receiving cavity of the vehicle from outside the vehicle.

The frame can be attached to the housing body and provide the closing structure at the opening of the housing to which the door cooperates to close the opening.

The motorized door assembly can contain multiple components that cooperate to hold electronic components, or any decorative or feature to be displayed, and allow for motorized access and display of the components held therein.

The motorized door assembly can be a singular modular unit with one or more components housed inside a housing behind the door. The motorized door assembly being modular can allow a user to swap out one motorized door assembly with a different motorized door assembly. This feature also allows a manufacturer to fabricate different modular units having the same size and installation requirements to offer a variety options that can readily be installed and operate the same. In one example, one motorized door assembly can house a television and speakers for audio and video entertainment, another motorized door assembly can house display cases, such as rare collections or trophies for sporting events or arts and crafts shows, and yet another motorized door assembly can house one or more cooking appliances.

The motorized door assembly can be secured to the vehicle by attaching the frame directly to the outer perimeter of the receiving cavity of the vehicle and/or the housing to the interior surfaces of the receiving cavity of the vehicle.

The door assembly can comprise a housing, a frame for mounting to the perimeter defining the opening of the housing, a door to close the opening of the frame and pivotally mount to the frame via pivot brackets, and a motor operable to swing the door to open or to close by rotating a pair of arms.

The frame can comprise a ledge or shoulder for the door to close against in the closed position. In some examples, the door can have sections that overlap the frame.

The arms can be coupled to the motor via a tube at one end and coupled to the door via a pair of slotted channels at the other end.

In some embodiments, the door can be pivotally mounted directly to the housing instead of to the frame.

In an example, the door can be coupled directly to the housing body or coupled to the housing via the frame.

In an alternative embodiment, the frame and the pivot brackets can be omitted.

The housing can have a rectangular prism shape body defined by a housing structure or housing body with four sidewalls and has a housing opening that opens into a housing cavity. On the opposite side of the housing opening, the housing can comprise a rectangular bottom wall with one or more cut-outs or openings.

A bottom wall can be connected to four side walls to define a housing structure. The four side walls of the housing can include an upper wall, a lower wall, and two sidewalls extending between opposite ends of the upper wall and the lower wall. The four walls can alternatively be called first, second, third, and fourth sidewalls.

The housing cavity can be configured to house one or more items or components, such as a display device, for example a television, and audio speakers for the display device, to provide a complete video entertainment experience. Switches, buttons, and other mechanisms can also be stored inside the housing cavity. The display device and speakers can be mounted inside the housing cavity using a display mounting bracket and a speaker mounting bracket, respectively.

In one example, the speakers can be mounted below the display device, but can also be mounted above the display device or on opposite lateral sides of the display device. The display device and the speakers can fit inside the housing cavity without extending past the housing opening or the frame fitted over the housing opening.

In other examples, one or more shelves can be provided inside the housing cavity and provide support surfaces for items, components, and products. Optimally, products stored inside the housing cavity should be anchored down and not move during transit of the vehicle.

One or more access holes can be formed through the bottom wall and/or the sidewalls of the housing to route cables and wires from the motor, route the power cord of the display device to a power source, route signal wires from a video/audio content source, signal wires of sensors in or on the housing, speaker wires from the speakers, or wires to and from other electronic components outside the motorized door assembly behind the bottom wall.

Access holes in the housing body can also be provided for mounting brackets to the housing and for mounting the housing to the vehicle.

A generally rectangular access hole can be provided for accommodating the display mounting bracket, such as to recess the display bracket into the vehicle wall, and a smaller circular access hole is provided below the rectangular access hole is provided to accommodate cables or wires extending to and from the housing cavity.

In one example, the depth of the housing cavity can accommodate the display mounting bracket without recessing the bracket into the vehicle wall.

The shape of the access holes in the housing are not limited and can be any shape depending on the size and shape of the components mounted in the housing cavity.

A plurality of display mounting holes can also be provided with the bottom wall of the housing for mounting the display mounting bracket to the bottom wall inside the housing cavity.

The bottom wall and the lower wall can also have a plurality of speaker mounting holes for mounting the speaker mounting bracket inside the housing cavity. The mounting holes can be through holes, formed as closed bores, or combinations thereof.

The sidewalls, upper wall, and lower wall of the housing can each have a plurality of frame mounting holes for securing the frame to the housing. Each sidewall of the housing can also have a plurality of mounting holes for mounting first and second support brackets thereon to support the motor.

In one example, three mounting holes of the housing body forming a triangular pattern to provide resistance against the torque produced from the motor. Additional or alternative mounting holes can be provided in a different pattern.

The shape of housing body can be a rectangular prism shape or any other shape to accommodate the space required for mounting the housing, the taste or aesthetic appeal of the owner of the vehicle and for concealing the components inside the housing behind the door.

The motor can be mounted directly to the housing body.

The display mounting bracket can include a base plate and a pair of tabs or mounting flanges extending outwardly from opposite sides of the base plate.

The base plate of the display mounting bracket can have a rectangular prism shape and extend into an access hole of the bottom wall with the tabs seated against the bottom wall of the housing.

In another example, the base plate display mounting bracket may not extend into the access hole.

The base plate display mounting bracket can be a rectangular prism. The base plate may also be other shapes.

A plurality of vertically aligned slots can extend through the tabs to align with the display mounting holes on the bottom wall of the housing for mounting the display mounting bracket to the bottom wall to support the display device.

The display mounting bracket can be mounted to the bottom wall using fasteners, such as screws, extending through the slots of the display mounting bracket into the display mounting holes of the bottom wall.

The slots in the tabs can allow vertical adjustment of the display device prior to fixing the display mounting bracket to the bottom wall.

The bottom wall can have three pairs of display mounting holes aligned vertically on opposite sides of an access hole coinciding with three vertically aligned slots on opposite sides of the display mounting bracket. In this configuration, a single fastener can extend through each vertically aligned slot of the tabs or flanges to allow the user to select either of a corresponding pair of display mounting holes to permit even greater vertical adjustment. In another configuration, two fasteners can engage with each pair of display mounting holes through each vertically aligned slot to provide a more secured engagement between the display mounting bracket and the bottom wall.

A nut, nutplate, or back plate having a plurality of tapped holes or inserts can be positioned behind the bottom wall of the housing outside the housing cavity and aligned with the slots of the display mounting bracket and the display mounting holes to receive fasteners to fix the display mounting bracket to the bottom wall of the housing. In other examples, screws can be used to screw directly into the bottom wall to secure the display mounting bracket.

A support plate can be slidably fixed on the base plate of the display bracket and positioned between the tabs for mounting the display device thereto.

In an example, the support plate can be horizontally adjustable along the base plate to adjust a horizontal position of the display device. In another example, the support plate can be fixed to prevent any horizontal movement of the display device.

In other examples, the support plate can telescopically extend from the base plate towards and/or out the opening of the housing for better viewing of the display device. In another example, the support plate can pivot about one or more pivot axes to allow rotation of the support plate and the display device attached thereto about the one or more pivot axes to adjust the viewing angle of the display.

A speaker mounting bracket can be mounted inside the housing cavity for attaching or securing speakers inside the housing cavity.

In an example, the speaker mounting bracket can comprise a support in the shape of elongated L-shaped extrusion with tabs or folded lips extending outwardly from the edges of the free ends of the support. Although the support can be an elongated L-shaped extrusion, other shapes are contemplated and can be dictated by the space and type of speakers to be mounted to the support. In another example, the tabs or folded lips of the speaker mounting bracket can extend substantially perpendicularly from the free ends of the L-shaped support away from each other.

A plurality of bracket holes can extend through the tabs and align with the speaker mounting holes on the bottom wall and the lower wall for mounting the speaker mounting bracket to the bottom wall and the lower wall.

The speaker mounting bracket can be mounted to the bottom wall and the lower wall using fasteners extending through the speaker bracket holes of the speaker mounting bracket into the speaker mounting holes of the bottom wall and the lower wall. A nut, nutplate, or back plate having a plurality of tapped holes or inserts can be positioned behind the bottom wall and the lower wall outside the housing cavity and aligned with the speaker bracket holes of the speaker mounting bracket and the speaker mounting holes to receive fasteners to fix the speaker mounting bracket to the bottom wall and the lower wall of the housing. In other examples, screws can be used to thread directly into the thickness of the bottom wall and the lower wall of the housing body.

When the speaker mounting bracket is installed to the housing, a speaker cavity can be formed by the L-shaped body, the lower wall and the bottom wall. One or more speakers can be captured in the speaker cavity. In one example, the speaker cavity can be a rectangular cavity for accommodating a rectangular sound bar. Wires from the speaker can be routed outside the speaker cavity through one or more access holes.

The support can have a plurality of through ports to allow sound emanating from the speakers to pass through the ports. The ports can be circular, but can be any shape to match the shape of the speakers in the speaker cavity. Speaker grills or covers can be mounted to the speaker mount bracket to cover the ports.

In another example, instead of speakers held inside the speaker cavity, the speakers can be mounted from outside the speaker cavity with the depth of each speaker extending through the ports and into the speaker cavity with a flange of each speaker fixed to the support. Any number of means can be practiced to secure the speakers from outside the speaker cavity to the support.

The frame can be mounted over the housing opening of the housing body to form a housing having a housing body and a frame. The frame can have a rectangular shape having a top frame opening extending into a frame cavity cooperatively formed by a rectangular frame bottom and four frame sides attached to the frame bottom. The frame bottom can have a plurality of pivot mounting holes and a bottom frame opening.

A flange can extend outwardly of an edge of each of the four frame sides at the perimeter of the frame opening. The frame can be fitted over the housing opening with the flange abutting the edges of the four sidewalls defining the perimeter of the housing opening and the four frame sides positioned snugly against or at least adjacent to the inside surfaces of the sidewalls, the top wall, and the bottom wall. The four frame sides can each have a plurality of frame holes extending therethrough and aligning with the frame mounting holes of the housing. A nut, nutplate, or back plate having a plurality of tapped holes or inserts can be positioned behind the bottom wall, the lower wall, and the sidewalls outside the housing cavity and aligned with the frame holes 18 of the frame and the frame mounting holes of the housing to receive fasteners to fix the frame to the housing. In another example, screws can tap directly into the sidewalls of the housing. The frame can also be fixed to the housing by interference fit or other attachment methods.

When the frame is attached or fixed to the housing, the frame can be considered to be a part of the housing.

Alternatively, the frame can be integrally formed with the housing. That is, the opening of the housing can form a frame around a perimeter of the opening.

The flange may also abut against the outer surface of the vehicle when mounting the motorized door assembly to the vehicle. In other words, the four frame sides can fit snugly in the housing opening and the flange extends over the exterior surface of the vehicle panel to cover the gap between the frame and the housing opening of the housing.

The door can be coupled to the frame by pivot brackets attached to the bottom surface 103 of the frame. The pivot brackets can be configured to secure and support the door within the frame and to provide the axis of rotation that allows the door to open and close.

The pivot brackets can include a left hand pivot bracket and a right hand pivot bracket each comprising a horizontal base and an ear extending at an angle from an edge of the horizontal base. In an example, the ear can extend substantially perpendicularly from the surface of the horizontal base. The horizontal base can have a plurality of pivot holes having a pattern matching the plurality of pivot mounting holes located in the frame bottom.

A nut, nutplate, or back plate having a plurality of tapped holes or inserts can be positioned behind and against the frame bottom with the tapped holes aligned with the pivot mounting and pivot holes of the frame bottom and the horizontal base to receive fasteners to fix the left hand pivot bracket and the right hand pivot bracket to the frame bottom inside the frame cavity. Alternatively, screws can tap directly into the frame bottom. In an example, nuts can be aligned with the pivot mounting holes and fixed on the frame bottom outside the frame cavity. In another example, the pivot brackets can be fixed to the frame using pivot bracket fasteners to extend through the pivot mounting and pivot holes of the frame bottom and the horizontal base to engage the tapped holes on the back plate.

With the pivot brackets installed to the frame, the ears can provide an axis of rotation for the door. Each ear can include a pivot hole configured to receive a pivot pin extending from the door that allows rotation of the door about the pivot hole.

The door itself can be a solid door or can be assembled from multiple components, panels, or pieces to form a light yet strong door. The door can be made from plastic, metal, wood, composite material, or combinations thereof.

In an example, the door has two outer layers with a light weight inner or insert located in between to reduce the overall weight of the door. The door can include an outer or first door component configured to face the environment, an inner or second door component that faces the audio and video components when the door is in the closed position, and a center insert made from a light weight material located between the first and second door components when the two are assembled together and provide an interior space for accommodating the center insert.

The outer or first door component can have a wall layer and a perimeter rim defining an internal cavity and the inner or second door component has a wall layer and a perimeter rim defining an internal cavity.

The first and second door components can be attached together by welding around a seam between the first and second door components, fasteners, adhesive, or a mechanical press fit engagement.

When the two door components are assembled together, the two internal cavities define an interior space, which can be a closed cavity, for accommodating the center insert.

In an example, the center insert is made from a foam material and can be understood as a foam insert. The center insert or foam insert can include two spaced apart vertical cutouts along two side edges. This allows two slotted channels mounted on the back door component to extend through two vertical slots on the inner or second door component and not be interfered by the foam insert, which provides the needed space for the slotted channels via the two vertical cutouts on the two side edges of the foam insert.

Both the front door component and the back door component can each have a rectangular prism shape having an opening opposite the respective wall layer on one of the sides extending into the internal cavity cooperatively defined with the four sidewalls extending out from edges of the wall layer. In one example, the front door component can be slightly larger than the back door component so that the back door component can be received inside the internal cavity of the front door component, similar to a lid of a box fitting onto the box.

During assembly, the openings of both the front door component and the back door component can face each other so that when the back door component is fitted inside the front door component, a closed cavity is formed. The center insert can be slightly smaller than the internal cavity of the back door component, so that the center insert can fit inside the closed cavity.

When assembled together to form the door, the back door component should be relatively flush with the opening of the front door component. In one example, the back door component extends slightly past the opening of the front door component. In another example, the back door component only extends to slightly inside the opening of the front door component.

The two vertical cutouts of the center insert can be aligned with the vertical slots of the back door component and slightly larger, such as wider, than the vertical slots of the back door component. The vertical cutouts of the center insert can cooperatively form two rectangular chambers with the two side ledges of the first and/or second door components. Said differently, the vertical cutouts of the center insert can each form a rectangular chamber with the front door component closing off one end of the rectangular chamber.

The vertical slots of the back door component can be narrower than the vertical cutouts of the foam insert so that the ledges are formed over the rectangular chamber. Tapped holes can be formed on back door component on opposite sides of the vertical slots for engaging fasteners used to attach the slotted channels to the back door component.

An infrared eye sensor can be incorporated with the motorized door assembly of the present disclosure. The infrared eye sensor can be mounted to the wall panel of the back door component and can extend through both a center cutout on the wall panel and a center cutout on the foam insert.

The infrared eye sensor can be directed or aimed out the back face of the door to face the housing cavity when the motorized door assembly is in the closed position. However, the infrared eye sensor may be directed out the front face of the door away from the housing cavity when the motorized door assembly is in the closed position. Furthermore, the location of the infrared eye sensor is not limited to the center of the door and can be located anywhere in the door or in the housing cavity.

The infrared eye sensor can serve as a detection sensor to detect the presence of a human and functions as a safety mechanism for the motorized door assembly by triggering a switch or relay to stop the door when a person is within a predetermined distance or proximity of the motorized door assembly. In one example, the door can stop if the person is within 2 meters from the sensor. In another example, the door can stop if the person is within the envelope of space occupied by the door from the open position to the closed position. This can protect the door from hitting the person when the door is opening or closing.

In another embodiment, the infrared eye sensor can be a thermal sensor configured to detect heat energy inside the housing cavity. In one example, the sensor can also be configured to detect whether the display device is powered on by sensing the heat energy emitted from the display device when the motorized door assembly is in the closed position. In still yet another example, the infrared eye sensor can be configured to determine whether the motorized door is in the open or closed position.

In other embodiments, sensors other than an infrared eye sensor can be used to detect body heat or motion, such as a microwave sensor, vibration sensor, ultrasonic sensor, or are reflective type sensors.

A groove may also extend from the center cutout of the center insert to an outside edge of the center insert to accommodate power and signal wires extending from the infrared eye sensor to outside the door.

For added safety to the display device and other components in the housing cavity, rubber guards can be attached to the back door component by engaging with cutouts on the wall panel of the back door component to provide a cushion in the event of unintended contact between the door and the display device when the motorized door assembly moves into the closed position.

In one example, the rubber guards can be elongated having a cross section of a narrow region necked down between two wider end regions. The protective rubber guards can be provided with ample surfaces to decrease the impact force on the display device should accidental contact occurs. Each guard cutout can have a width wider than the neck region but narrower than the end regions. The rubber guard can be assembled in the respective cutout by squeezing one end region of the rubber guard through the cutout until the neck region is engaged and secured in the cutout.

In another embodiment, the door can be made of a solid material and formed with vertical cutouts, grooves, holes, and other cavities to minimize the number of components used to produce the door. By substituting a solid door with a shell having a foam core, the weight of the door can be significantly decreased while minimizing loss in structural integrity.

The door assembly or door can have a front face or surface, a back face or surface opposite the front face and facing the housing cavity, and four side surfaces between the front and back faces. The four side surfaces can include a top side, a bottom side, and a pair of lateral sides between the top and bottom sides.

When the motorized door assembly is assembled to the vehicle, the front face or surface can be an exterior surface exposed to the environment, and the back face or surface can be an interior surface facing the housing cavity in the closed position.

A pivot pin can extend from each lateral side of the door adjacent the top side of the door. The pivot pins can allow the door to pivot near the top side of the door. Each pivot pin can extend through a corresponding pivot hole of the ear of the pivot bar, and the door can rotate about a rotation axis substantially defined by the pivot holes.

Each pivot pin can have a pin head and a pin shaft extending through a corresponding pivot hole between the pin head and a lateral side of the door. In one example, each pin head can have a cross-head or Phillips-head screw, and the pin shaft can have a shank and a threaded end portion threadedly engaged in a threaded hole in a corresponding lateral side of the door.

The size of the pivot hole can be slightly larger than the size of the pin shaft but smaller than a size of the pin head to capture the ear within the pin shaft and prevent the pin shaft from sliding out the pivot hole.

The top side of the door can be spaced from the frame side to allow a tool to threadedly engage the pivot bracket fasteners into the back plate through the holes of the frame bottom and the horizontal base when installing the pivot brackets to the frame. Said differently, access can be provided to the pivot bracket fasteners to install the door assembly to the housing assembly, or more specifically the frame, and to remove the door assembly from the housing assembly when the door is in the closed position. The access can allow the door to be removed if the motor is damaged in the closed position, as an example.

In an embodiment, a seal can be provided on the frame or door to form a seal between the frame and the door to seal out moisture or contaminants from entering the housing cavity.

In another example, a seal can also be provided in the gap or space between the frame side and the top side of the door.

The back face of the door can have a pair of pockets extending vertically along the back face from near the top side to near the bottom side. Each pocket can include a rectangular chamber formed by the vertical cutouts of the foam insert and a pair of ledges formed by the vertical cutouts of the back door component on opposite sides of the chamber running adjacent the lateral sides of the door. Each pocket can be configured to receive a slotted channel.

Each of the slotted channels can have an elongated U-shaped channel having flanges extending from the upper edges of the channel. The channel opening can extend into a channel cavity cooperatively formed by a channel bottom and sidewalls extending from the channel bottom. The sidewalls can include two long sidewalls and a flange extending outwardly from each of the long sidewalls. The long sidewalls can each have a slot running vertically from one end of the long sidewall towards the other end of the long sidewall. Each slotted channel can be configured to fit inside a corresponding cavity of the door with the flanges seated against the ledges and the slots defined in the long sidewalls positioned adjacent the bottom side of the door. The slotted channels can be fixed inside the pockets by adhesive, fasteners extending through the flanges into tapped holes of the corresponding ledges, or other conventional securing means.

The motorized door assembly can utilize a first support bracket and a second support bracket for supporting the motor. Each of the first and second support brackets can include a support wall having a set of three bracket holes matching the pattern of the mounting holes in the sidewalls. In other examples, the matching pattern can have other number of holes.

Each of the first and second support brackets can be fixed to a sidewall inside the housing cavity by fasteners extending through the mounting holes and the bracket holes.

Each of the first and second support brackets may also include an auxiliary wall extending from the edge of the base wall thereby forming an L-shaped bracket. The auxiliary wall can provide additional support by resisting against the top wall of the housing when a torque is applied by the motor.

The support wall of the first support bracket can further include a set of four roller support holes adjacent the set of bracket holes to support a roller support. The roller support can include a base having four legs extending transversely from the base. Each leg can include a base hole corresponding to one of the roller support holes. The roller support can be fixed to the first support bracket by fasteners extending through the roller support holes and the base holes.

A tip receptacle can extend substantially perpendicularly from a center of the base of the roller support. The tip receptacle can have a pin cavity to receive a tip or spindle of a gudgeon attached to the motor. The support wall of the second support bracket can further include a set of two motor support holes adjacent the set of bracket holes to support the motor.

The motor can include a motor head having two tapped holes or inserts extending into the motor head corresponding to the motor support holes. The motor can further include a rotatable shaft and a motor adapter connected to the shaft to be rotatable thereby. The motor adapter can move relative to the motor head. The motor can be a conventional AC or DC powered motor with sufficient power and torque to open the door. The motor adapter can be fitted inside a bore of a roller tube. When the motor is activated, the motor adapter can rotate the tube in a door opening direction to open the door or a door closing direction to close the door. Depending on the viewing perspective, the rotation can be considered a clockwise rotation or a counter-clockwise rotation.

The motor can be operated remotely. The housing can be equipped with a controller and a locally mounted switch to activate the motor, or both.

The motor adapter may be press fitted inside the bore of the tube and/or aligned with a key such as protrusions or grooves of the bore engaging with complementing grooves and protrusions of the motor adapter to control rotation of the tube in the door opening direction and/or the door closing direction opposite the door opening direction.

The motor adapter and the bore of the tube may also incorporate gears so that the motor adapter can rotate the tube through gearing.

A gudgeon can be press fitted onto the free end of the tube to engage the roller support, which can allow the tube to rotate freely in either direction. The gudgeon can include a crown and a tip or spindle extending from the crown. The crown can be press fitted inside the bore of the tube or mechanically fixed to the free end of the tube and the spindle can be received in the pin cavity of the tip receptacle.

The pin cavity of the tip receptacle can provide support for the free end of the tube and allow the tube to spin freely in the pin cavity when the motor is activated. The pin cavity can be a smooth concave receptacle. In one example, the pin cavity can have a spherical surface or a conical surface. In another example, the pin cavity can be defined inside a hollow cylindrical extension extending from the base of the roller support with a breakout along the length of a surface of the hollow cylindrical extension to allow the tip of the gudgeon to slip into the cavity The motor can draw power from the vehicle battery, such as 12 VDC, or an external or separate battery housed inside the housing or vehicle and electrically connected to the motor. The separate battery may also be a rechargeable battery electrically connected to the vehicle battery to recharge the separate battery while supplying power to the motor. The separate battery may also optionally be charged by photocells, which can be mounted somewhere external of the vehicle, such as on the roof of the vehicle. In one example, the power requirement of the motor is about 6.7 Watts, which would draw of about 0.6 Amps with a retraction speed of about 34 rpm.

Before the motor can be activated to rotate the tube, the motor head can be anchored to the housing so that the motor adapter can rotate relative to the motor head. The motor head can be anchored to the second support bracket by fasteners extending through the motor support holes and engaging the motor head mounting holes.

The motor head may also be anchored to the second support bracket by providing interference by rotation by having a non-circular shaped motor head matching a similar shaped cutout in an internal surface of the support wall of the second support bracket to receive the non-circular shaped motor head, thereby anchoring the motor head to the second support bracket. The non-circular shapes of the motor head and cutout in the support wall of the second support bracket can provide interference from rotation.

Because the second support bracket is fixed to the sidewall of the housing 20 when assembled, the motor head can also be deemed fixed to the housing. The motor head can be securely fastened to the second support bracket by securing fasteners extending through the second support bracket and engaging with the tapped holes or inserts in the motor head. The second support bracket may include counter bores at an external surface of the support wall so that fastener heads or nuts for threading to the securing fasteners, such as to threaded float rods or threaded rods, to secure the motor head of the motor to the support wall can recess inside the counter bores.

When the motor is activated, the motor adapter can be configured to rotate the tube in the door opening direction to open the door and rotate the tube in the door closing direction to close the door. The door can be coupled to the tube by a pair of arms slidably received around the tube at a first end and slidably attached to the slots of the slot channel by roller pins at a second end opposite the first end.

In an example, the first end of each arm can have a bore with a pin extending radially inward from the bore. In one example, the first end of each arm can completely wrap around a circumference of the tube to form a complete bore.

In another example, the first end of each arm does not completely wrap around the circumference of the tube to form a partial bore thereby minimizing weight. For example, the first end of each arm can wrap around a circumference of the tube to a radial measurement of less than 180 degrees, 180 degrees, or more than 180 degrees but not completely around the tube.

The pin can be assembled inside the bore, such by pressing a dowel pin into a corresponding bore or threading a screw into a threaded hole. The bore of the first end can slide over the tube with the pin sliding in a longitudinal slot extending across the outer surface of the length of the tube. The bore can have a rotation axis substantially coaxial with the rotation axis of the tube. The engagement between the pin inside the slot can lock the rotation of the arm with the tube. The gap between the pin inside the slot can be minimized to improve motor control of the door.

The arm can have an arm extension and a second end opposite the first end. The second end can have a roller pin hole extending through the second end to receive a roller pin with rollers 98 fixed on opposite ends of the roller pin.

The rollers can secure the roller pin in the roller pin hole. The rollers can slidably engage the slots formed in the long sidewalls of the corresponding slotted channel and can extend into the slots. The second end of the arm and at least a part of the extension can extend into the channel cavity and can move inside the channel cavity as the door opens and closes.

The gap between the arm and the channel cavity should be sufficiently large as to not restrict rotation of the second end inside the channel cavity, but small enough to minimize movement of the arm along the tube. Thus, the engagement with the arm in the slotted channel can minimize axial movement of the arm with the tube.

The materials of the components of the motorized door assembly can be made of a high strength lightweight material. For example, the housing, support brackets, pivot bar, and frame can be made from a metal material, such as thin metal sheets. The roller support and the crown of the gudgeon can be made of high density plastic. The spindle of the gudgeon can be made from a metal material, such as steel or aluminum. The arms and slotted channels can be machined from hard plastic, such as ABS. The roller pins can be made from a high strength metal material, such as stainless steel. The rollers can be made of a soft metal material, such copper or brass. The tube can be made of a metal material, such as galvanized steel.

When the motor adapter rotates the tube in the door opening direction to reveal the display device, the tube can rotate the arm thereby rotating the arm outwardly from inside the housing cavity and the frame cavity.

The second end of the arm can press against the door as the arm rotates outwardly, by pressing against the slots via the rollers. Because the rotation axis of the tube and the arms is different than the rotation axis of the door, the rollers can slide along the slots of the slotted channels to prevent the door from binding.

When the door is fully opened or opened to a desired angle, power to the motor can cease. When the door is to be closed, power can be supplied to the motor to rotate the tube in the door closing direction thereby rotating the arm into the housing cavity until the door is fully closed at the desired angle.

The motor adapter can be controlled remotely or directly by a switch, such as a remote wall switch or key, or a switch or key directly on the motorized door assembly. Once a desired position is reached, such as in a fully open position, power to the motor can be cut. After power to the motor is cut, brakes on the motor may hold the tube in any position thereby preventing the tube from rotating in the unwinding direction from the weight of the door under gravity.

The degree of opening of the door can be controlled by operation of the motor.

A seal may be provided along the frame bottom to prevent moisture and debris from entering into the housing cavity when the door is fully closed.

Aspects of the present disclosure include a motorized door assembly for a vehicle which can comprise a housing, a door coupled to the housing, a motor, and an arm coupled to the door and the motor. The housing can have a housing body, a housing opening for accessing a housing cavity, the housing cavity being sized and shaped to accommodate one or more components therein. The door can have an exterior surface and an interior surface facing the housing cavity when the door is in a closed position. The door can be coupled to the housing and rotatable with respect to the housing about a door pivot axis. The door can cover the housing opening and conceal the housing cavity in the door closed position, and reveal the housing cavity in a door open position. The motor can comprise a motor head fixed to the housing and a motor adapter rotatably coupled to the motor head about a motor rotation axis different than the pivot axis. The motor rotation axis and the door pivot axis can be offset from one another. The arm can be coupled to the door and the motor.

The rotation of the motor adapter can causes rotation of the door about the pivot axis.

The door can be rotatable about the door pivot axis when the motor adapter rotates.

The rotation of the motor adapter in a door opening direction can cause the arm to push the door open.

The arm can push the door open when the motor adapter rotates in a door opening direction.

The arm can have a first end coupled to the motor adapter and a second end slidably coupled to the door.

The second end of the arm can have a roller engaged in a slot formed in the door. The second end can extend into the door.

The first end can define a bore extending through the first end of the arm, and a tube extending through the bore of the first end.

A pin can extend radially inwardly from the bore of the first end and engage in a longitudinal slot extending across the outer surface of the length of the tube.

A frame can be attached to the housing opening, with the door being rotatably coupled to the frame.

The housing can further comprise a frame attached to the housing opening and where the door can be rotatably coupled to the frame Two Door pivot brackets LH and RH can be attached to the frame, with the door being rotatably coupled to the pivot brackets.

A pair of pivot pins can extend from lateral side surfaces of the door and engage pivot holes in the pivot bar to define the pivot axis.

Each pivot pin can include a pin head and a pin shaft extending from the pin head into the door. The pin head can be larger than the pivot hole.

The door can include a first component, a second component attached to the first component to cooperatively define an interior space, and a center insert received in the interior space.

A seal can be formed around a bottom surface of the frame and engage the door in the door closed position.

An infrared sensor can be mounted to the door to stop the door when a person is within a predetermined distance from the door.

Another aspect of the present disclosure can include a method of forming a motorized door assembly for a vehicle. The method can comprise providing a housing having a housing opening extending into a housing cavity, rotatably coupling a door to the housing about a pivot axis, positioning a motor inside the housing cavity, the motor comprising a motor head fixed to the housing and a motor adapter rotatably coupled to the motor head about a rotation axis different than the pivot axis, and coupling a first end of an arm to the motor and a second end of the arm to the door.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of motorized door assemblies for use with motorized vehicles provided in accordance with aspects of the present assemblies, systems, and methods and is not intended to represent the only forms in which the present assemblies, systems, and methods may be constructed or utilized. The description sets forth the features and the steps for constructing and using embodiments of the present assemblies, systems, and methods in connection with the illustrated embodiments. It is to be understood, however, that the same or equivalent functions and structures may be accomplished by different embodiments that are also intended to be encompassed within the scope of the present disclosure. As denoted elsewhere herein, like element numbers are intended to indicate like or similar elements or features.

Figure 1:
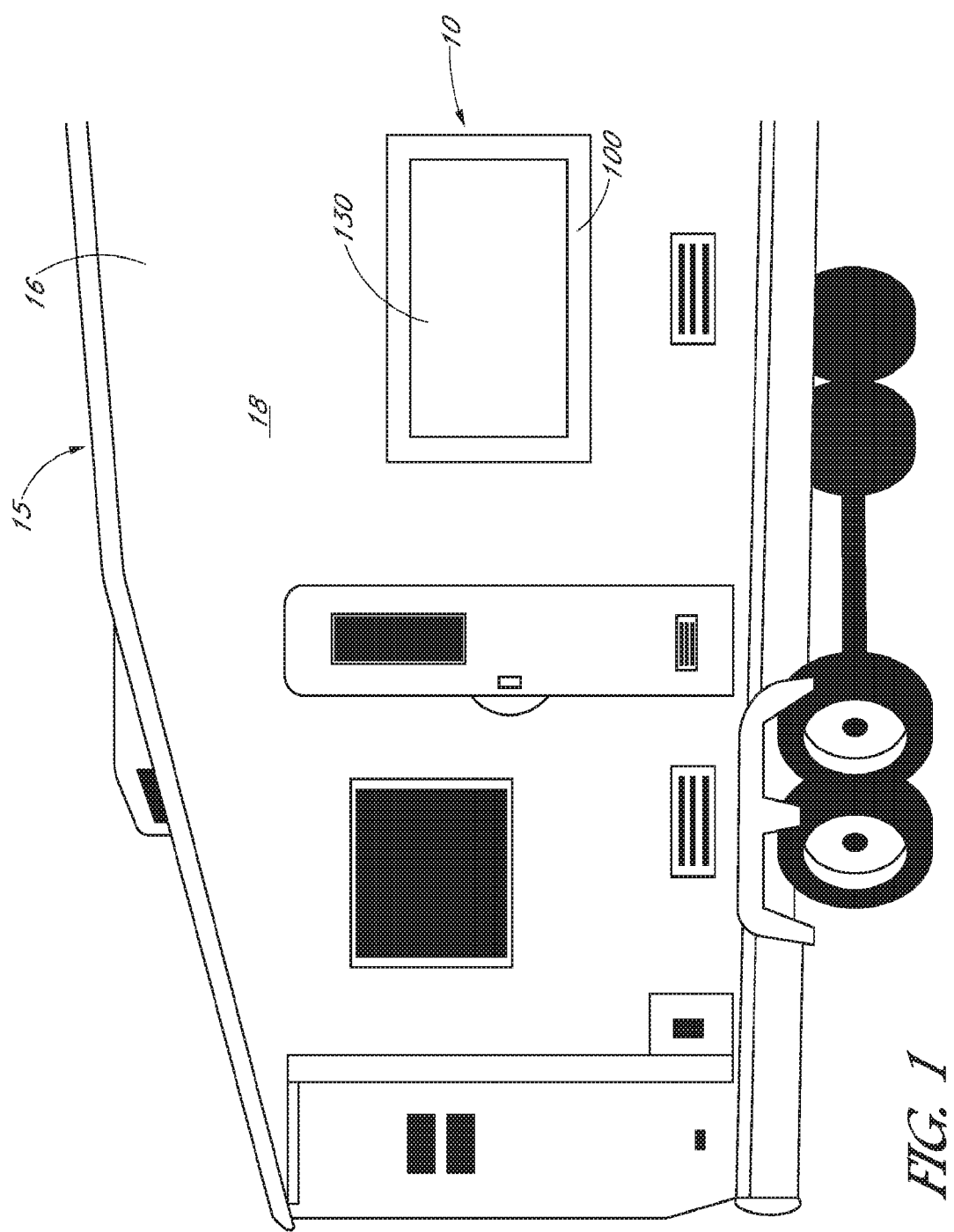
FIG. 1 is a partial perspective view of a motor vehicle having a motorized door assembly mounted therewith in accordance with aspects of the present disclosure, shown in a door closed position.

With reference now to FIG. 1, a motorized door assembly 10 provided in accordance with aspects of the present disclosure is shown in a closed, stowed, or retracted position and assembled to a vehicle 15, such as to a recreational vehicle or a trailer. The motorized door assembly 10 is configured to conceal one or more components, such as a television monitor and/or speakers or other entertainment components or systems, behind a door 130, which can be moved to open/close by a remotely operated motor 50 (FIG. 3) to expose or cover the one or more components. In an example, the motorized door assembly 10 is configured to open by rotating the door 130 outwardly to expose and reveal the components directly mounted to the vehicle 15, and close to cover the components from view. For example, the door 130 can pivot along an edge and the free edge of the door can be rotated outwardly to expose opening of the housing assembly and the components to the environment.

The motorized door assembly 10 comprises a door 130 seated with a frame 100, which can be installed on to the skin or panel 18 along the exterior of the vehicle 15 in a receiving cavity with both the frame 100 and the door 130 generally flush with an outer surface 16 of the vehicle 15 when the door is in the closed position to present a smooth appearance. In another example, the frame 100 and/or the door 130 are not flush-mounted to the panel 18 and may protrude outwardly from the outer surface 16 of the vehicle 15. In yet another example, the frame 100 and the door 130 may be slightly recessed from the outer surface 16 of the vehicle 15. As shown, the motorized door assembly 10 is located outside the vehicle 15 and at least part of the door and the frame are exposed to the environment but can alternatively be mounted inside the vehicle 15. In some examples, the motorized door assembly 10 is mounted to a different exterior section of the vehicle 15, such as to the rear panel or to an opposing side panel.

Figure 2:
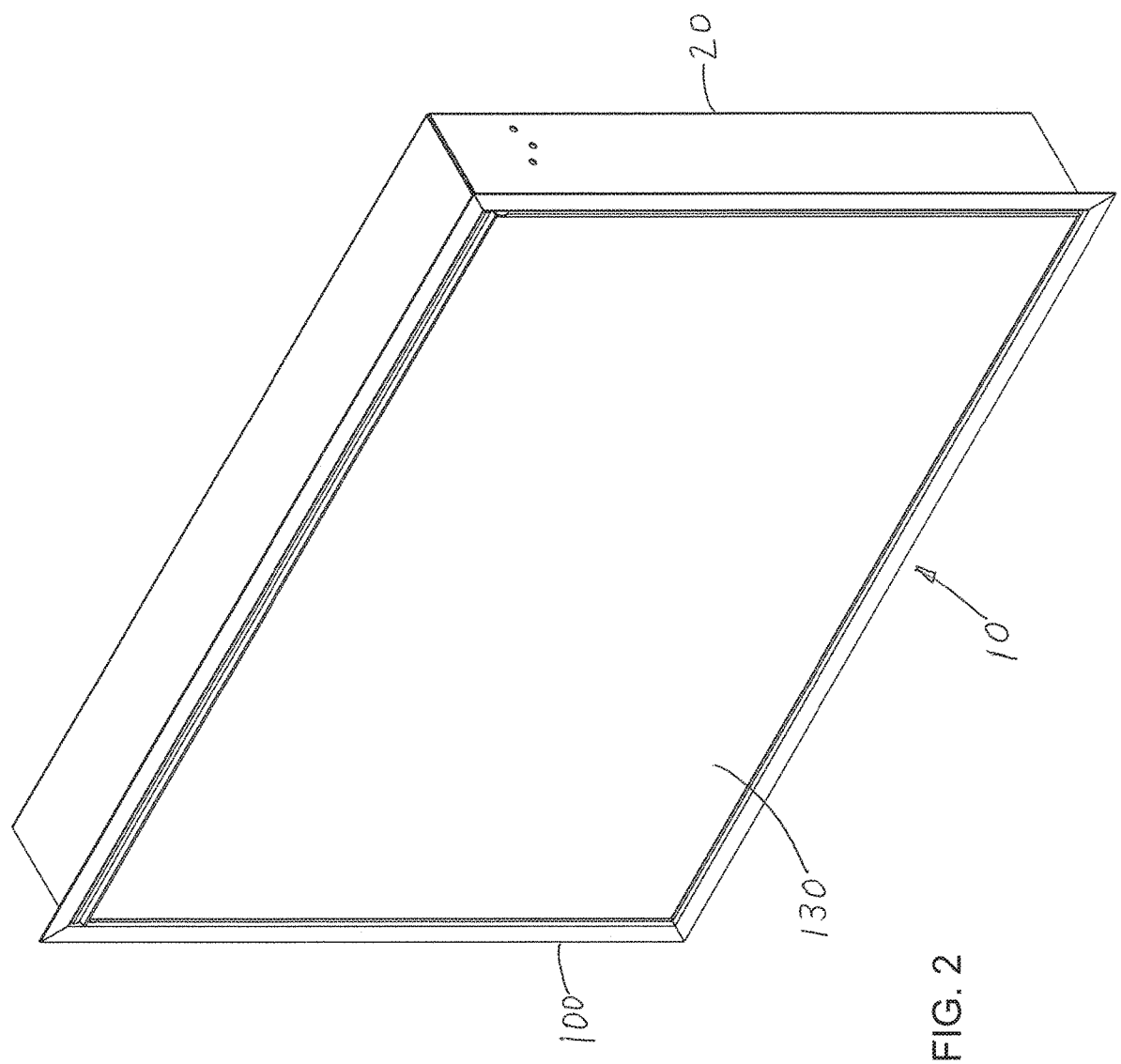
FIG. 2 is a perspective view of the motorized door assembly of FIG. 1 separated from the motor vehicle, shown in the closed position.

Referring now to FIG. 2, the motorized door assembly 10 is shown in the closed position away or apart from the vehicle 15. The motorized door assembly 10 comprises a housing 20, which can have any number of different shapes with rectangle being more optimum, a frame 100 attached to the housing 20, and a door 130 attached to the frame 100. The housing 20 can be used to drop into a receiving cavity of the vehicle 15 from outside the vehicle 15. The frame 100 is attached to the housing and provides the closing structure at the opening of the housing to which the door 130 cooperates to close the opening. The motorized door assembly 10 contains multiple components that cooperate to hold electronic components, or any decorative or feature to be displayed, and allow for motorized access and display of the components held therein.

The motorized door assembly 10 can be a singular modular unit with one or more components housed inside a housing 20 behind the door 130. This feature can allow a user to swap out one motorized door assembly 10 with a different motorized door assembly. This feature also allows a manufacturer to fabricate different modular units having the same size and installation requirements to offer a variety options that can readily be installed and operate the same. For example, one motorized door assembly 10 can house a television and speakers for audio and video entertainment, another motorized door assembly 10 can house display cases, such as rare collections or trophies for sporting events or arts and crafts shows, and yet another motorized door assembly can house one or more cooking appliances. The motorized door assembly 10 can be secured to the vehicle 15 by attaching the frame 100 directly to the outer perimeter of the receiving cavity of the vehicle 15 and/or the housing 20 to the interior surfaces of the receiving cavity of the vehicle 15.

Figure 3:
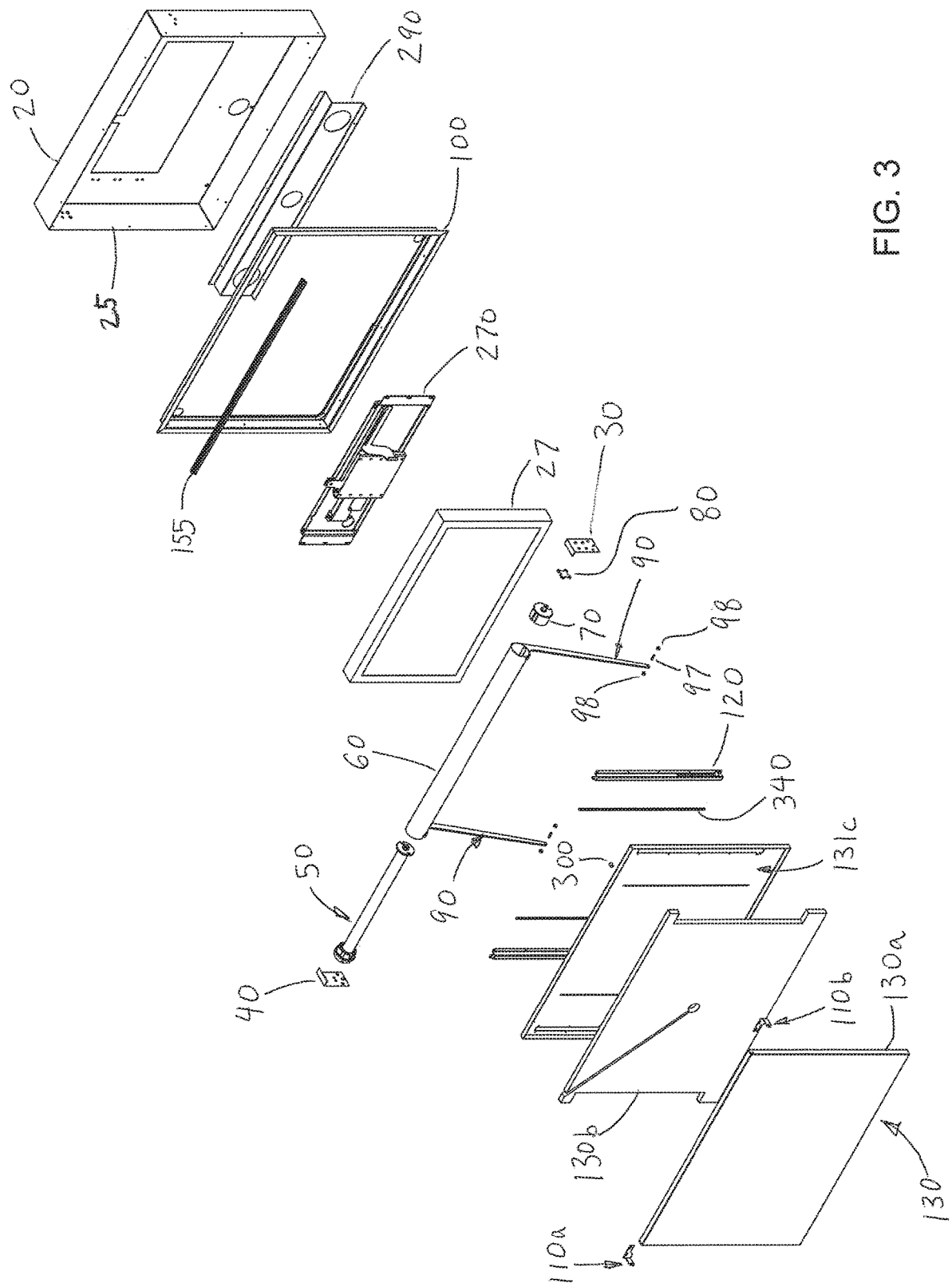
FIG. 3 is an exploded perspective view of the motorized door assembly of FIG. 1.

With reference now to FIG. 3, an exploded view of the motorized door assembly 10 is shown. The door assembly 10 can comprise a housing 20, a frame 100 for mounting to the perimeter defining the opening 25 of the housing 20, a door 130 to close the opening of the frame 100 and pivotally mountable to the frame 100 via pivot brackets 110, and a motor 50 operable to swing the door 130 to open or to close by rotating a pair of arms 90. The frame 100 can comprise a ledge or shoulder for the door 130 to close against in the closed position. In some examples, the door 130 can have sections that overlap the frame 100. The arms 90 can be coupled to the motor 50 via a tube 60 at one end and coupled to the door 130 via a pair of slotted channels 120 at the other end. In some embodiments, the door 130 can be pivotally mounted directly to the housing 20 instead of to the frame 100. In an example, the door 130 can be coupled directly to the housing 20 or coupled to the housing 20 via the frame 100. In an alternative embodiment, the frame 100 and the pivot brackets 110 can be omitted. Details of the components that make up the motorized door assembly 10 in accordance with aspects of the present invention will be discussed further below.

Figure 4:
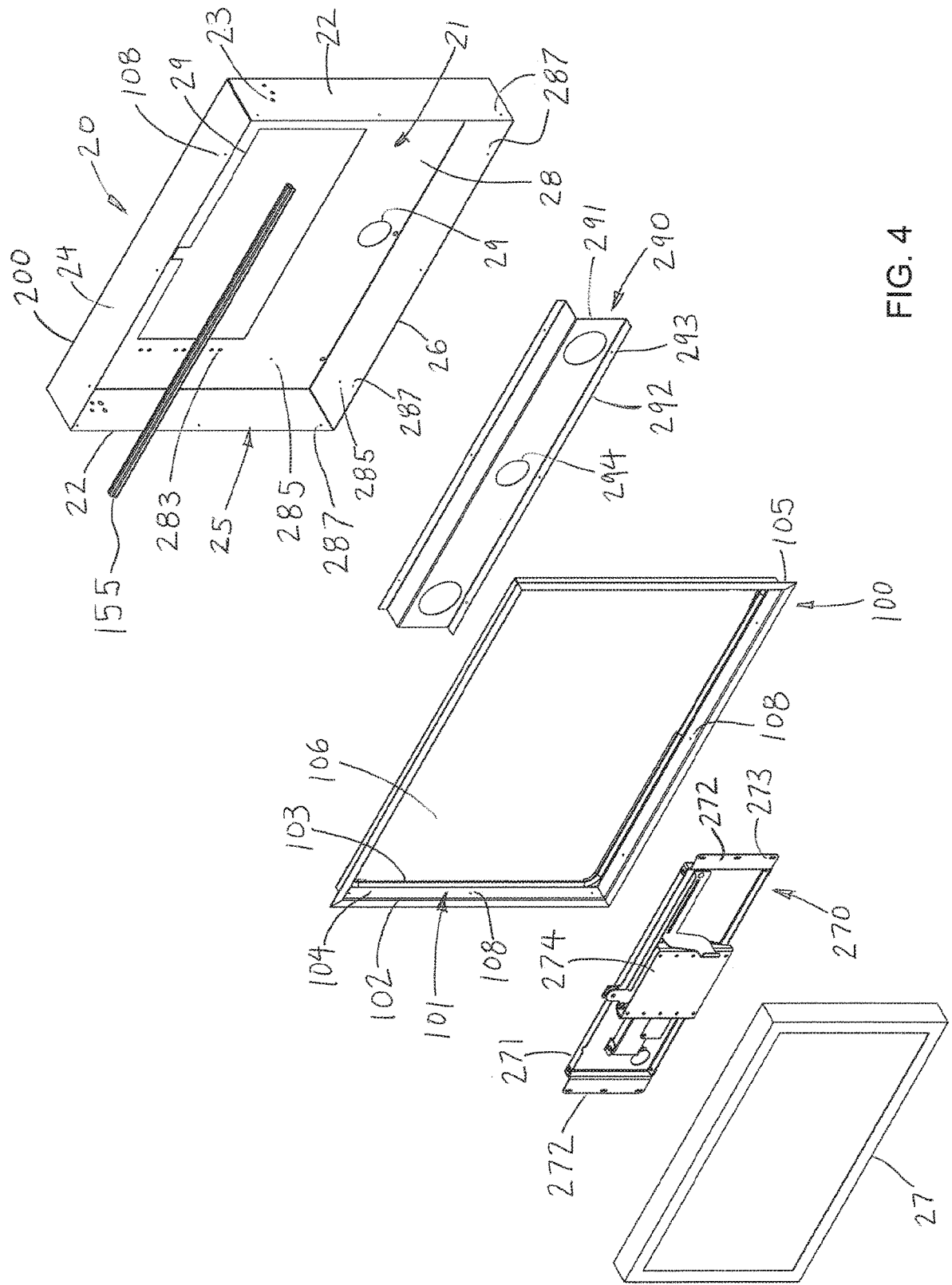
FIG. 4 is an exploded expanded perspective view of some of the components, such as the housing assembly, of the motorized door assembly of FIG. 3.

Turning now to FIG. 4 and with continued reference to FIG. 3, the housing 20 can have a rectangular prism shape body defined by a housing structure or housing body 200 with four sidewalls and has a housing opening 25 that opens into a housing cavity 21. On the opposite side of the housing opening 25, the housing 20 comprises a rectangular bottom wall 28 with one or more cut-outs or openings. The bottom wall 28 is connected to the four side walls to define a housing structure with a bottom wall 28. The four side walls of the housing cavity 21 can include an upper wall 24, a lower wall 26, and two sidewalls 22 extending between opposite ends of the upper wall 24 and the lower wall 26. The four walls 22, 24, 26 can alternatively be called first, second, third, and fourth sidewalls. The housing cavity 21 can be configured to house one or more items or components, such as a display device 27, for example a television, and audio speakers for the display device 27, to provide a complete video entertainment experience. Switches, buttons, and other mechanisms can also be stored inside the housing cavity. The display device 27 and speakers can be mounted inside the housing cavity 21 using a display mounting bracket 270 and a speaker mounting bracket 290, respectively. In one example, the speakers can be mounted below the display device 27, but can also be mounted above the display device 27 or on opposite lateral sides of the display device 27. The display device 27 and the speakers can fit inside the housing cavity 21 without extending past the housing opening 25 or the frame 100 fitted over the housing opening 25. In other examples, one or more shelves can be provided inside the housing cavity and provide support surfaces for items, components, and products. Optimally, products stored inside the housing cavity should be anchored down and not move during transit of the vehicle.

One or more access holes 29 can be formed through the bottom wall 28 and/or the sidewalls 22 of the housing 20 to route cables and wires from the motor 50, route the power cord of the display device 27 to a power source, route signal wires from a video/audio content source, signal wires of sensors in or on the housing 20, speaker wires from the speakers, or wires to and from other electronic components outside the motorized door assembly 10 behind the bottom wall 28. Access holes can also be provided for mounting brackets to the housing and for mounting the housing to the vehicle. As shown, a generally rectangular access hole is provided for accommodating the display mounting bracket 270, such as to recess the display bracket into the vehicle wall, and a smaller circular access hole is provided below the rectangular access hole is provided to accommodate cables or wires extending to and from the housing cavity 21. In other examples, the depth of the housing cavity 21 can accommodate the display mounting bracket without recessing the bracket into the vehicle wall. The shape of the access holes 29 are not limited and can be any shape depending on the size and shape of the components mounted in the housing cavity 21.

A plurality of display mounting holes 283 can also be provided with the bottom wall 28 for mounting the display mounting bracket 270 to the bottom wall 28 inside the housing cavity 21 as further explained below. The bottom wall 28 and the lower wall 26 can also have a plurality of speaker mounting holes 285 for mounting the speaker mounting bracket 290 inside the housing cavity 21 as discussed below. The mounting holes can be through holes, formed as closed bores, or combinations thereof.

The sidewalls 22, upper wall 24, and lower wall 26 of the housing 20 can each have a plurality of frame mounting holes 287 for securing the frame 100 to the housing 20. Each sidewall 22 of the housing 20 can also have a plurality of mounting holes 23 for mounting first and second support brackets 30, 40 (FIGS. 3 and 9) thereon to support the motor 50. As shown, three mounting holes 23 are provided forming a triangular pattern to provide resistance against the torque produced from the motor 50. Additional mounting holes 23 and holes provided in a different pattern can alternatively be incorporated. Although the housing body 200 is shown having a rectangular prism shape, other shapes of the housing body 200 are contemplated to accommodate the space required for mounting the housing, the taste or aesthetic appeal of the owner of the vehicle 15 and for concealing the components inside the housing 20 behind the door 130. In some embodiments, the motor 50 can be mounted directly to the housing 20.

The display mounting bracket 270 can include a base plate 271 and a pair of tabs or mounting flanges 272 extending outwardly from opposite sides of the base plate 271. In an example, the base plate 271 can have a rectangular prism shape and extend into an access hole 29 of the bottom wall 28 with the tabs 272 seated against the bottom wall 28 of the housing 20. In another example, the base plate 271 does not extend into the access hole 29. Although the base plate 271 is shown as a rectangular prism, other shapes of the base plate 271 are contemplated.

A plurality of vertically aligned slots 273 can extend through the tabs 272 to align with the display mounting holes 283 on the bottom wall 28 of the housing 20 for mounting the display mounting bracket 270 to the bottom wall 28 to support the display device 27. The display mounting bracket 270 can be mounted to the bottom wall 28 using fasteners, such as screws, extending through the slots 273 of the display mounting bracket 270 into the display mounting holes 283 of the bottom wall 28. The slots 273 can allow vertical adjustment of the display device 27 prior to fixing the display mounting bracket 270 to the bottom wall 28. As shown, the bottom wall 28 has three pairs of display mounting holes 272 aligned vertically on opposite sides of an access hole 29 coinciding with three vertically aligned slots 273 on opposite sides of the display mounting bracket 270. In this configuration, a single fastener can extend through each vertically aligned slot 273 of the tabs or flanges to allow the user to select either of a corresponding pair of display mounting holes 272 to permit even greater vertical adjustment. In another configuration, two fasteners engage with each pair of display mounting holes 272 through each vertically aligned slot 273 to provide a more secured engagement between the display mounting bracket 270 and the bottom wall. A nut, nutplate, or back plate having a plurality of tapped holes or inserts can be positioned behind the bottom wall 28 of the housing 20 outside the housing cavity 21 and aligned with the slots 273 of the display mounting bracket 270 and the display mounting holes 283 to receive fasteners to fix the display mounting bracket 270 to the bottom wall 28 of the housing 20. In other examples, screws can be used to screw directly into the bottom wall 28 to secure the display mounting bracket 270.

A support plate 274 can be slidably fixed on the base plate 271 of the display bracket and positioned between the tabs 272 for mounting the display device 27 thereto. In an example, the support plate 274 can be horizontally adjustable along the base plate 271 to adjust a horizontal position of the display device 27. In another example, the support plate 274 can be fixed to prevent any horizontal movement of the display device 27. In other examples, the support plate 274 can telescopically extend from the base plate 271 towards and/or out the opening 25 of the housing 20 for better viewing of the display device 27. In another example, the support plate 274 can pivot about one or more pivot axes to allow rotation of the support plate 274 and the display device 27 attached thereto about the one or more pivot axes to adjust the viewing angle of the display 27.

A speaker mounting bracket 290 may also be mounted inside the housing cavity 21 for attaching or securing speakers inside the housing cavity 21. In an example, the speaker mounting bracket 290 can comprise a support 291 in the shape of elongated L-shaped extrusion with tabs or folded lips 292 extending outwardly from the edges of the free ends of the support 291. Although the support 291 is shown as an elongated L-shaped extrusion, other shapes are contemplated and can be dictated by the space and type of speakers to be mounted to the support. In one example, the tabs or folded lips 292 of the speaker mounting bracket 290 extend substantially perpendicularly from the free ends of the L-shaped support 291 away from each other. A plurality of bracket holes 293 can extend through the tabs 292 and align with the speaker mounting holes 285 on the bottom wall 28 and the lower wall 26 for mounting the speaker mounting bracket 290 to the bottom wall 28 and the lower wall 26.

The speaker mounting bracket 290 can be mounted to the bottom wall 28 and the lower wall 26 using fasteners extending through the speaker bracket holes 293 of the speaker mounting bracket 290 into the speaker mounting holes 285 of the bottom wall 28 and the lower wall 26. A nut, nutplate, or back plate having a plurality of tapped holes or inserts can be positioned behind the bottom wall 28 and the lower wall 26 outside the housing cavity 21 and aligned with the speaker bracket holes 293 of the speaker mounting bracket 270 and the speaker mounting holes 285 to receive fasteners to fix the speaker mounting bracket 290 to the bottom wall 28 and the lower wall 26 of the housing 20. In other examples, screws can be used to thread directly into the thickness of the bottom wall 28 and the lower wall 26 of the housing. When the speaker mounting bracket 290 is installed to the housing 20, a speaker cavity is formed by the L-shaped body, the lower wall 26 and the bottom wall 28. One or more speakers can be captured in the speaker cavity. In one example, the speaker cavity can be a rectangular cavity for accommodating a rectangular sound bar. Wires from the speaker can be routed outside the speaker cavity through one or more access holes 29. The support 291 can have a plurality of through ports 294 to allow sound emanating from the speakers to pass through the ports 294. As shown, the ports 294 are circular, but can be any shape to match the shape of the speakers in the speaker cavity. Speaker grills or covers can be mounted to the speaker mount bracket 290 to cover the ports 294. In another example, instead of speakers held inside the speaker cavity, the speakers can be mounted from outside the speaker cavity with the depth of each speaker extending through the ports 294 and into the speaker cavity with a flange of each speaker fixed to the support 291. Any number of means described elsewhere herein can be practiced to secure the speakers from outside the speaker cavity to the support 291.

The frame 100 can be mounted over the housing opening 25 of the housing 20. The frame 100 can have a rectangular shape having a top frame opening 102 extending into a frame cavity 101 cooperatively formed by a rectangular frame bottom 103 and four frame sides 104 attached to the frame bottom 103. The frame bottom 103 can have a plurality of pivot mounting holes 107 (FIG. 5) and a bottom frame opening 106. A flange 105 extends outwardly of an edge of each of the four frame sides 104 at the perimeter of the frame opening 102. The frame 100 can be fitted over the housing opening 25 with the flange 105 abutting the edges of the four sidewalls 22, 24 26 defining the perimeter of the housing opening 25 and the four frame sides 104 positioned snugly against or at least adjacent to the inside surfaces of the sidewalls 22, the top wall 24, and the bottom wall 26. The four frame sides 104 can each have a plurality of frame holes 108 extending therethrough and aligning with the frame mounting holes 287 of the housing 20. A nut, nutplate, or back plate having a plurality of tapped holes or inserts can be positioned behind the bottom wall 28, the lower wall 26, and the sidewalls 22 outside the housing cavity 21 and aligned with the frame holes 108 of the frame 100 and the frame mounting holes 287 of the housing 20 to receive fasteners to fix the frame 100 to the housing 20. In another example, screws can tap directly into the sidewalls of the housing 20. The frame 100 can also be fixed to the housing 20 by interference fit or other attachment methods. When the frame 100 is attached or fixed to the housing 20, the frame 100 can be considered to be a part of the housing 10. Alternatively, the frame 100 can be integrally formed with the housing 20. That is, the opening of the housing can form a frame 100 around a perimeter of the opening. The flange 105 may also abut against the outer surface 16 of the vehicle 15 when mounting the motorized door assembly 10 to the vehicle 15. In other words, the four frame sides 104 can fit snugly in the housing opening 25 and the flange 105 extends over the exterior surface of the vehicle panel to cover the gap between the frame 100 and the housing opening 25 of the housing 20.

Figure 5:
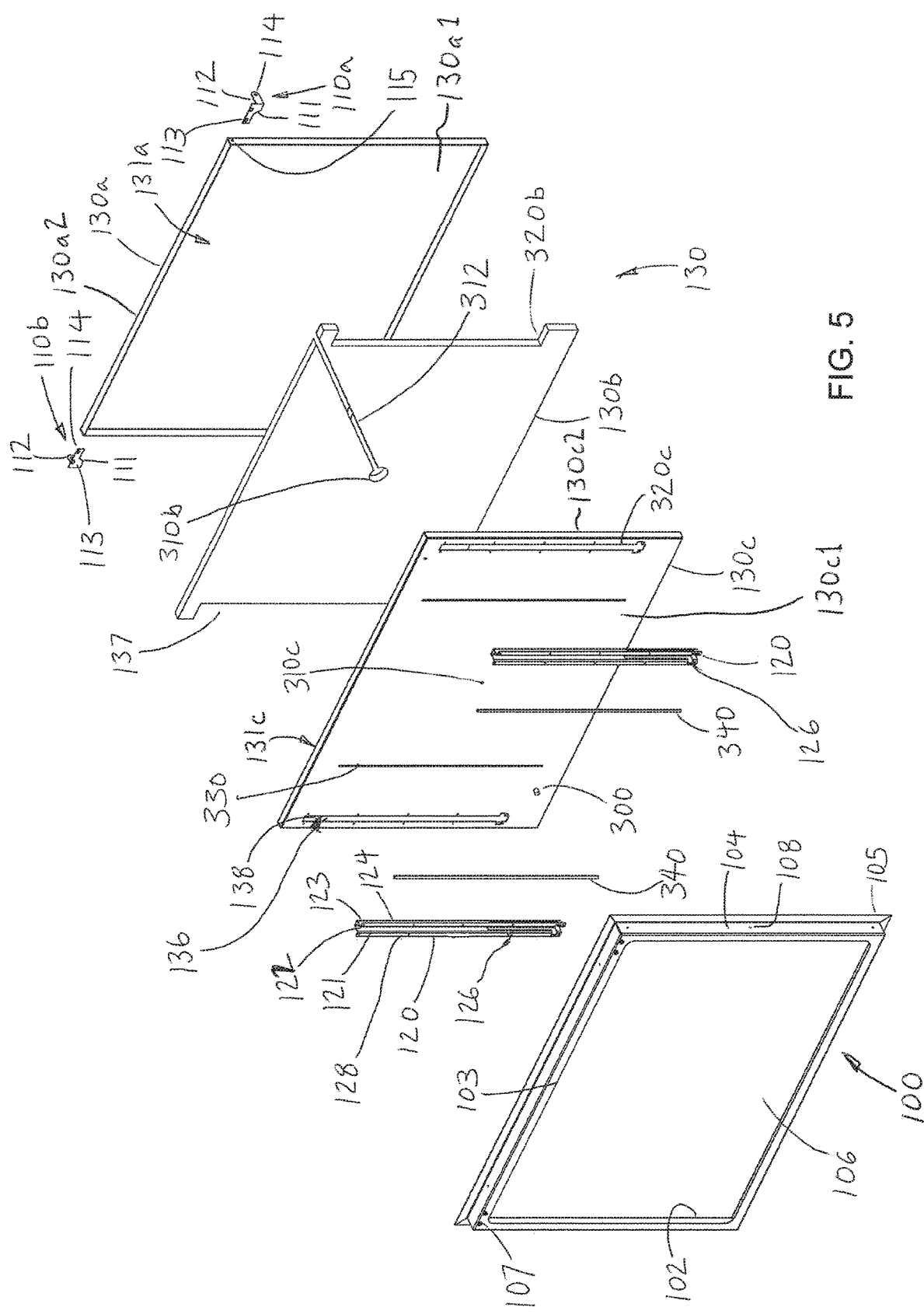
FIG. 5 is an exploded expanded perspective view of some of the components, such as the frame of the housing assembly and door assembly, of the motorized assembly of FIG. 3 from a different aspect.

Turning now to FIG. 5, the door 130 can be coupled to the frame 100 by pivot brackets 110a, 110b, or collectively as 110, attached to the bottom surface 103 of the frame 100. The pivot brackets 110 can be configured to secure and support the door 130 within the frame 100 and to provide the axis of rotation that allows the door 130 to open and close. The pivot brackets 110 can include a left hand pivot bracket 110a and a right hand pivot bracket 110b each comprising a horizontal base 111 and an ear 112 extending at an angle from an edge of the horizontal base 111. In an example, the ear 112 can extend substantially perpendicularly from the surface of the horizontal base 111. The horizontal base 111 can have a plurality of pivot holes 113 having a pattern matching the plurality of pivot mounting holes 107 located in the frame bottom 103. A nut, nutplate, or back plate having a plurality of tapped holes or inserts can be positioned behind and against the frame bottom 103 with the tapped holes aligned with the pivot mounting and pivot holes 107, 113 of the frame bottom 103 and the horizontal base 111 to receive fasteners to fix the left hand pivot bracket 110a and the right hand pivot bracket 110b to the frame bottom 103 inside the frame cavity 101. Alternatively, screws can tap directly into the frame bottom 103. As shown, nuts are aligned with the pivot mounting holes 107 and fixed on the frame bottom 103 outside the frame cavity 101. In one example, the pivot brackets 110a, 110b can be fixed to the frame 100 using pivot bracket fasteners 119 (FIG. 6) to extend through the pivot mounting and pivot holes 107, 113 of the frame bottom 103 and the horizontal base 111 to engage the tapped holes 151 on the back plate. With the pivot brackets installed to the frame 100, the ears 112 can provide an axis of rotation for the door 130. Specifically, each ear 112 can include a pivot hole 114 configured to receive a pivot pin 115 extending from the door 130 that allows rotation of the door 130 about the pivot hole 114, as further discussed below.

The door 130 itself can be a solid door or can be assembled from multiple components, panels, or pieces to form a light yet strong door 130. The door can be made from plastic, metal, wood, composite material, or combinations thereof. In an example, the door 130 has two outer layers with a light weight inner or insert located in between to reduce the overall weight of the door. As shown, the door 130 can include an outer or first door component 130a configured to face the environment, an inner or second door component 130c that faces the audio and video components when the door is in the closed position, and a center insert 130b made from a light weight material located between the first and second door components 130a, 130c when the two are assembled together and provide an interior space for accommodating the center insert 130b. In another example, the center insert 130b can be omitted. The first and second door components 130a, 130c can be attached together by welding around a seam between the first and second door components 130a, 130c, fasteners, adhesive, or a mechanical press fit engagement.

As shown, the outer or first door component 130a has a wall layer 130a1 and a perimeter rim 130a2 defining an internal cavity 131a and the inner or second door component 130c has a wall layer 130c1 and a perimeter rim 130c2 defining an internal cavity 131c. When the two door components 130a, 130c are assembled together, the two internal cavities 131a, 131c define an interior space, which can be a closed cavity, for accommodating the center insert 130b. In an example, the center insert is made from a foam material and can be understood as a foam insert 130b. The center insert or foam insert 130b can include two spaced apart vertical cutouts 320b along two side edges. This allows two slotted channels 120 mounted on the back door component 130c to extend through two vertical slots 320c on the inner or second door component 130c and not be interfered by the foam insert 130b, which provides the needed space for the slotted channels 120 via the two vertical cutouts 320b on the two side edges of the foam insert. Aspects of the door 130 are further discussed below.

Both the front door component 130a and the back door component 130c can each have a rectangular prism shape having an opening opposite the respective wall layer 130a1, 130c1 on one of the sides extending into the internal cavity 131a, 131c cooperatively defined with the four sidewalls 130a2, 130c2 extending out from edges of the wall layer 130a1, 130c1. In one example, the front door component 130a is slightly larger than the back door component 130c so that the back door component 130c can be received inside the internal cavity of the front door component, similar to a lid of a box fitting onto the box. During assembly, the openings of both the front door component 130a and the back door component 130b face each other so that when the back door component 130c is fitted inside the front door component 130a, a closed cavity is formed. The center insert 130b is slightly smaller than the internal cavity of the back door component 130c, so that the insert foam 130b can fit inside the closed cavity. When assembled together to form the door 130, the back door component 130c should be relatively flush with the opening of the front door component 130a. In one example, the back door component 130c extends slightly past the opening of the front door component 130a. In another example, the back door component 130c only extends to slightly inside the opening of the front door component 130a.

The two vertical cutouts 320b of the foam insert 130b are aligned with the vertical slots 320c of the back door component 130c and slightly larger, such as wider, than the vertical slots 320c of the back door component 130c. The vertical cutouts 320b of the foam insert cooperatively form two rectangular chambers with the two side ledges of the first and/or second door components 130a, 130c. Said differently, the vertical cutouts 320b of the foam insert 130b each forms a rectangular chamber with the front door component 130a closing off one end of the rectangular chamber. The vertical slots 320c of the back door component 130c is narrower than the vertical cutouts 320b of the foam insert 130b so that the ledges are formed over the rectangular chamber. Tapped holes 321 can be formed on back door component 130c on opposite sides of the vertical slots 320c for engaging fasteners used to attach the slotted channels 120 to the back door component 130c, as further discussed below.

In an example, an infrared eye sensor 300 can be incorporated with the motorized door assembly 10 of the present disclosure. The infrared eye sensor 300, when incorporated, can be mounted to the wall panel 130c1 of the back door component 130c and can extend through both a center cutout 310c on the wall panel 130c1 and a center cutout 310b on the foam insert 130b. As shown, the infrared eye sensor 300 can be directed or aimed out the back face of the door 130 to face the housing cavity 21 when the motorized door assembly is in the closed position. However, the infrared eye sensor 300 may be directed out the front face of the door 130 away from the housing cavity 21 when the motorized door assembly is in the closed position. Furthermore, the location of the infrared eye sensor 300 is not limited to the center of the door 130 and can be located anywhere in the door 130 or in the housing cavity 21.

The infrared eye sensor 300 can serve as a detection sensor to detect the presence of a human and functions as a safety mechanism for the motorized door assembly 10 by triggering a switch or relay to stop the door 130 when a person is within a predetermined distance or proximity of the motorized door assembly 10. In one example, the door 130 will stop if the person is within 2 meters from the sensor 300. In another example, the door 130 will stop if the person is within the envelope of space occupied by the door 130 from the open position to the closed position. This can protect the door from hitting the person when the door is opening or closing. In another embodiment, the infrared eye sensor 300 can be a thermal sensor configured to detect heat energy inside the housing cavity 21. In one example, the sensor 300 can also be configured to detect whether the display device 27 is powered on by sensing the heat energy emitted from the display device 27 when the motorized door assembly 10 is in the closed position. In still yet another example, the infrared eye sensor 300 can be configured to determine whether the motorized door is in the open or closed position. In other embodiments, sensors other than an infrared eye sensor 300 can be used to detect body heat or motion, such as a microwave sensor, vibration sensor, ultrasonic sensor, or are reflective type sensors. A groove 312 may also extend from the center cutout 310b of the foam insert 130b to an outside edge of the foam insert 130b to accommodate power and signal wires extending from the infrared eye sensor 300 to outside the door 130.

For added safety to the display device 27 and other components in the housing cavity 21, rubber guards 340 can be attached to the back door component 130c by engaging with cutouts 330 on the wall panel 130c1 of the back door component 130c to provide a cushion in the event of unintended contact between the door 130 and the display device 27 when the motorized door assembly 10 moves into the closed position. In one example, the rubber guards can be elongated having a cross section of a narrow region necked down between two wider end regions. The protective rubber guards can be provided with ample surfaces to decrease the impact force on the display device should accidental contact occurs. Each guard cutout 330 has a width wider than the neck region but narrower than the end regions. The rubber guard 340 can be assembled in the respective cutout 330 by squeezing one end region of the rubber guard 340 through the cutout 330 until the neck region is engaged and secured in the cutout 330.

In another embodiment, the door 130 is made of a solid material and formed with vertical cutouts, grooves, holes, and other cavities to minimize the number of components used to produce the door 130. However, by substituting a solid door with a shell having a foam core, the weight of the door 130 can be significantly decreased while minimizing loss in structural integrity.

Figure 6:
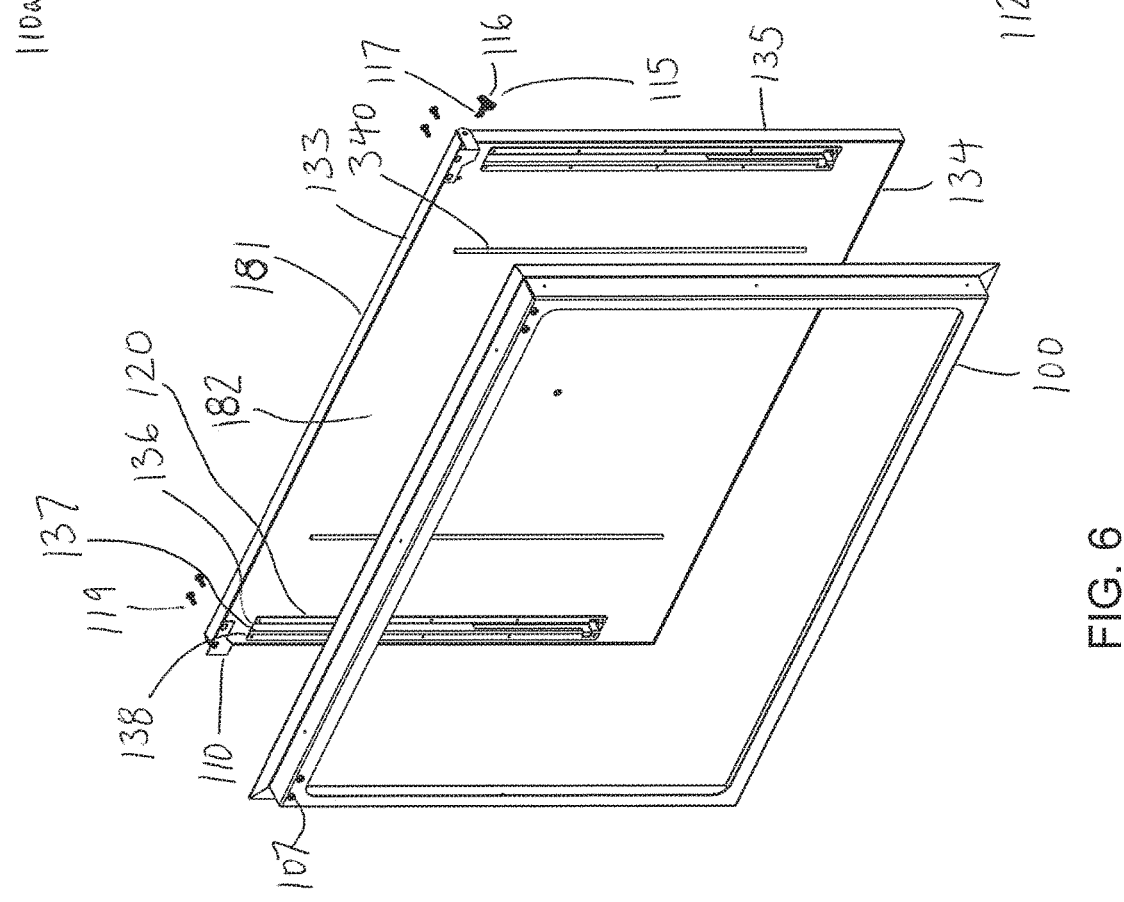
FIG. 6 is a perspective view of the door assembly prior to assembly to the frame.

Referring also to FIG. 6, the door assembly or door 130 has a front face or surface 181, a back face or surface 182 opposite the front face 181 and facing the housing cavity 21, and four side surfaces between the front and back faces 181, 182. The four side surfaces include a top side 133, a bottom side 134, and a pair of lateral sides 135 between the top and bottom sides 133, 134. When the motorized door assembly 10 is assembled to the vehicle 15, the front face or surface 181 is an exterior surface exposed to the environment, and the back face or surface 182 is an interior surface facing the housing cavity in the closed position.

A pivot pin 115 can extend from each lateral side 135 of the door 130 adjacent the top side 133 of the door 130. The pivot pins 115 allow the door 130 to pivot near the top side 133 of the door 130. Each pivot pin 115 extends through a corresponding pivot hole 114 of the ear 112 of the pivot bar 100. Thus, the door 130 can rotate about a rotation axis substantially defined by the pivot holes 114. Each pivot pin 115 can have a pin head 116 and a pin shaft 117 extending through a corresponding pivot hole 114 between the pin head 116 and a lateral side 135 of the door 130. In one example, each pin head 116 can have a cross-head or Phillips-head screw, and the pin shaft 117 can have a shank and a threaded end portion threadedly engaged in a threaded hole in a corresponding lateral side 135 of the door. The size of the pivot hole 114 can be slightly larger than the size of the pin shaft 117 but smaller than a size of the pin head 116 to capture the ear 112 within the pin shaft 117 and prevent the pin shaft 117 from sliding out the pivot hole 114. Additionally, the tighter the fit between the pin shaft 117 and the pivot hole 114, the more accurately the rotation axis of the door 130 is defined.

Figure 7:
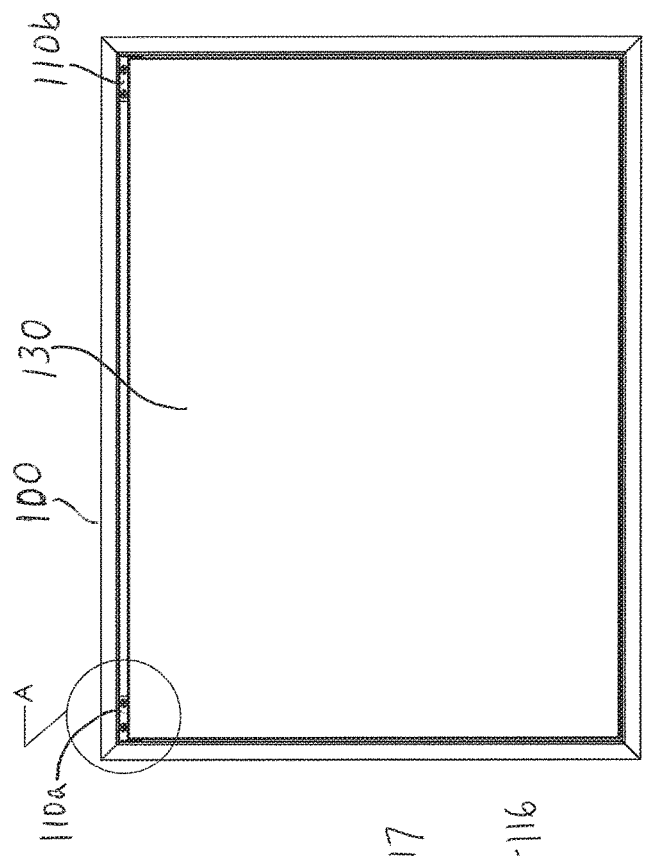
FIG. 7 is a front view of the door assembly assembled to the frame.
Figure 8:
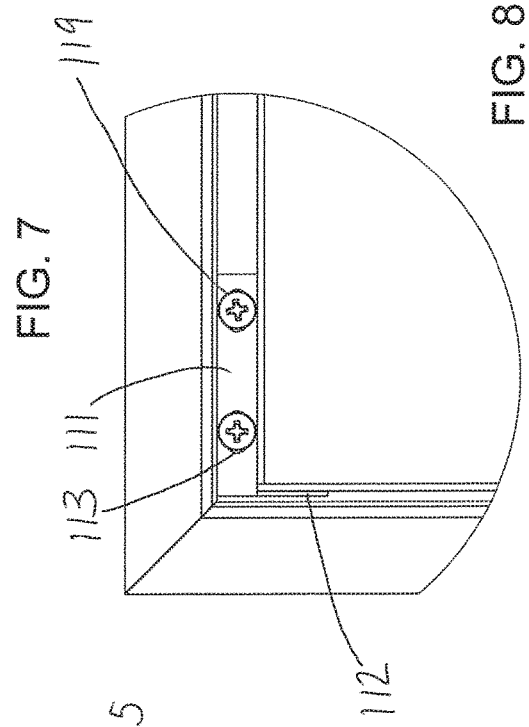
FIG. 8 is an enlarged view of circled portion A of FIG. 7.

Referring to FIGS. 7 and 8, the top side 133 of the door 130 is spaced from the frame side 104 to allow a tool to threadedly engage the pivot bracket fasteners 119 into the back plate through the holes 107, 113 of the frame bottom 103 and the horizontal base 111 when installing the pivot brackets 110 to the frame 100. Said differently, access is provided to the pivot bracket fasteners 119 to install the door assembly to the housing assembly, or more specifically the frame 100, and to remove the door assembly from the housing assembly when the door 130 is in the closed position. The access allows the door 130 to be removed if the motor 150 is damaged in the closed position, as an example. In an embodiment, a seal 155 can be provided on the frame 100 or door 130 to form a seal between the frame 100 and the door 130. In another example, a seal 155 can also be provided in the gap or space between the frame side 104 and the top side 133 of the door 130. Because the door 130 is rotatable with respect to the pivot brackets 110, fixing the pivot brackets 110 to the frame 100 also means that the door 130 is pivotable with respect to the frame 100.

Referring back to FIGS. 5 and 6, the back face 182 of the door 130 can have a pair of pockets 136 extending vertically along the back face 182 from near the top side 133 to near the bottom side 134. Each pocket 136 can include a rectangular chamber 137 formed by the vertical cutouts 320b of the foam insert 130b and a pair of ledges 138 formed by the vertical cutouts 320c of the back door component 130c on opposite sides of the chamber 137 running adjacent the lateral sides 135 of the door 130. Each pocket 136 can be configured to receive a slotted channel 120, as further discussed below.

Each of the slotted channels 120 can have an elongated U-shaped channel having flanges extending from the upper edges of the channel. The channel opening 121 can extend into a channel cavity 122 cooperatively formed by a channel bottom 123 and sidewalls extending from the channel bottom 123. The sidewalls can include two long sidewalls 124 and a flange 128 extending outwardly from each of the long sidewalls 124. The long sidewalls 124 each has a slot 126 running vertically from one end of the long sidewall 124 towards the other end of the long sidewall 124. Each slotted channel 120 is configured to fit inside a corresponding cavity 136 of the door 130 with the flanges 128 seated against the ledges 138 and the slots 126 defined in the long sidewalls 24 positioned adjacent the bottom side 134 of the door 130. The slotted channels 120 can be fixed inside the pockets 136 by adhesive, fasteners extending through the flanges 123 into tapped holes 321 of the corresponding ledges 138, or other conventional securing means.

Figure 9:
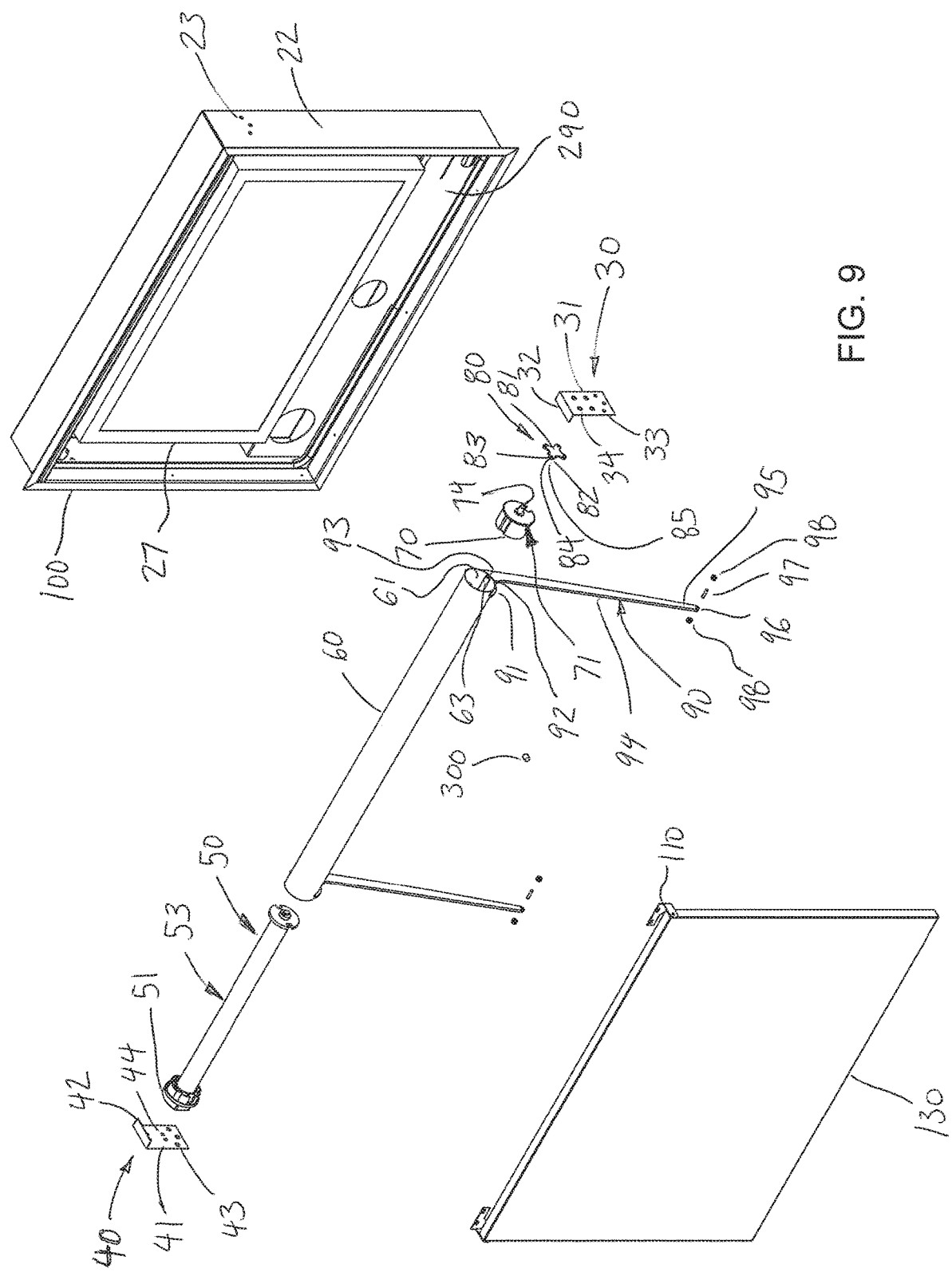
FIG. 9 is a partial exploded perspective view of the motor assembly prior to assembly to the door assembly and the housing assembly.

Turning now to FIG. 9, the motorized door assembly 10 can utilize a first support bracket 30 and a second support bracket 40 for supporting the motor 50. Each bracket 30, 40 can include a support wall 31, 41 having a set of three bracket holes 33, 43 matching the pattern of the mounting holes 23 in the sidewalls 22. In other examples, the matching pattern can have other number of holes. Each bracket 30, 40 can be fixed to a sidewall 22 inside the housing cavity 21 by fasteners extending through the mounting holes 23 and the bracket holes 33, 43. Each bracket 30, 40 may also include an auxiliary wall 32, 42 extending from the edge of the base wall 31, 41 thereby forming an L-shaped bracket 30, 40. The auxiliary wall 32, 42 can provide additional support by resisting against the top wall 24 of the housing 20 when a torque is applied by the motor 50.

The support wall 31 of the first support bracket 30 can further include a set of four roller support holes 34 adjacent the set of bracket holes 33 to support a roller support 80. The roller support 80 can include a base 81 having four legs 82 extending transversely from the base 81. Each leg 82 can include a base hole 83 corresponding to one of the roller support holes 34. Thus, the roller support 80 can be fixed to the first support bracket 30 by fasteners extending through the roller support holes 34 and the base holes 83. A tip receptacle 84 can extend substantially perpendicularly from a center of the base 81. The tip receptacle 84 has a pin cavity 85 to receive a tip or spindle 74 of a gudgeon 70 attached to the motor 50, as explained in further detail below. The support wall 41 of the second support bracket 40 can further include a set of two motor support holes 44 adjacent the set of bracket holes 43 to support the motor 50.

The motor 50 can include a motor head 51 having two tapped holes or inserts extending into the motor head 51 corresponding to the motor support holes 44. The motor 50 can further include a rotatable shaft and a motor adapter 53 connected to the shaft to be rotatable thereby. The motor adapter 53 can move relative to the motor head 51. The motor 50 can be a conventional AC or DC powered motor with sufficient power and torque to open the door 130. The motor adapter 53 can be fitted inside a bore 61 of a roller tube 60. When the motor 50 is activated, the motor adapter can rotate the tube 60 in a door opening direction to open the door or a door closing direction to close the door. Depending on the viewing perspective, the rotation can be considered a clockwise rotation or a counter-clockwise rotation. The motor 50 can be operated remotely, the housing 20 can be equipped with a controller and a locally mounted switch to activate the motor 50, or both. The motor adapter 53 may be press fitted inside the bore 61 and/or aligned with a key (not shown) such as protrusions or grooves of the bore 61 engaging with complementing grooves and protrusions of the motor adapter 53 to control rotation of the tube 60 in the door opening direction and/or the door closing direction opposite the door opening direction.

The motor adapter 53 and the bore 61 may also incorporate gears so that the motor adapter 53 can rotate the tube 60 through gearing. A gudgeon 70 can be press fitted onto the free end of the tube 60 to engage the roller support 80, which allows the tube 60 to rotate freely in either direction. More specifically, the gudgeon 70 can include a crown 71 and a tip or spindle 74 extending from the crown 71. The crown 71 can be press fitted inside the bore 61 or mechanically fixed to the free end of the tube 60 and the spindle 74 can be received in the pin cavity 85 of the tip receptacle 84. The pin cavity 85 can provide support for the free end of the tube 60 and allows the tube 60 to spin freely in the pin cavity 85 when the motor is activated. The pin cavity can be a smooth concave receptacle. In one example, the pin cavity can have a spherical surface or a conical surface.

The motor 50 can draw power from the vehicle battery, such as 12 VDC, or an external or separate battery housed inside the housing 20 or vehicle 15 and electrically connected to the motor 50. The separate battery may also be a rechargeable battery electrically connected to the vehicle battery to recharge the separate battery while supplying power to the motor 50. The separate battery may also optionally be charged by photocells, which can be mounted somewhere external of the vehicle 15, such as on the roof of the vehicle. In one example, the power requirement of the motor 115 is about 6.7 Watts, which would draw of about 0.6 Amps with a retraction speed of about 34 rpm.

Before the motor 50 can be activated to rotate the tube 60, the motor head 51 can be anchored to the housing 20 so that the motor adapter 53 can rotate relative to the motor head 51. The motor head 51 can be anchored to the second support bracket 40 by fasteners extending through the motor support holes 44 and engaging the motor head mounting holes 52. The motor head 51 may also be anchored to the second support bracket by providing interference by rotation. This can be accomplished by having a non-circular shaped motor head 51 matching a similar shaped cutout (not shown) in an internal surface of the support wall 41 of the second support bracket 40 to receive the non-circular shaped motor head 51, thereby anchoring the motor head 51 to the second support bracket 40. The non-circular shapes of the motor head 51 and cutout in the support wall 41 of the second support bracket 40 can provide interference from rotation.

Because the second support bracket 40 is fixed to the sidewall 22 of the housing 20 when assembled, the motor head 51 can also be deemed fixed to the housing 20. The motor head 51 can be securely fastened to the second support bracket 40 by securing fasteners extending through the second support bracket 40 and engaging with the tapped holes or inserts 52 in the motor head 51. The second support bracket 40 may include counter bores at an external surface of the support wall 41 so that fastener heads or nuts for threading to the securing fasteners, such as to threaded float rods or threaded rods, to secure the motor head 51 of the motor to the support wall 41 can recess inside the counter bores.

When the motor 50 is activated, the motor adapter 53 is configured to rotate the tube 60 in the door opening direction to open the door 130 and rotate the tube 60 in the door closing direction to close the door 130. The door 130 can be coupled to the tube 60 by a pair of arms 90 slidably received around the tube 60 at a first end 91 and slidably attached to the slots 126 of the slot channel 120 by roller pins 97 at a second end 95 opposite the first end 91, as further discussed below.

In an example, the first end 91 of each arm 90 can have a bore 92 with a pin 93 extending radially inward from the bore 92. In one example, the first end 91 of each arm 90 completely wraps around a circumference of the tube 60 to form a complete bore 92. In another example, the first end 91 of each arm 90 does not need to completely wrap around the circumference of the tube 60 to form a partial bore 92 thereby minimizing weight. For example, the first end 91 of each arm 90 can wrap around a circumference of the tube to a radial measurement of less than 180 degrees, 180 degrees, or more than 180 degrees but not completely around the tube 160. The pin 93 can be assembled inside the bore, such by pressing a dowel pin into a corresponding bore or threading a screw into a threaded hole. The bore 92 of the first end 91 can slide over the tube 60 with the pin 93 sliding in a longitudinal slot 63 extending across the outer surface of the length of the tube 60. The bore 92 can have a rotation axis substantially coaxial with the rotation axis of the tube 60. The engagement between the pin 93 inside the slot 63 can lock the rotation of the arm 90 with the tube 60. Thus, rotation of the tube 60 can rotate the arm 90. The gap between the pin 93 inside the slot 63 can be minimized to improve motor control of the door 130.

The arm 90 can have an arm extension 94 and a second end 95 opposite the first end 91. The second end 95 can have a roller pin hole 96 extending through the second end 95 to receive a roller pin 97 with rollers 98 fixed on opposite ends of the roller pin 97. The rollers 98 can secure the roller pin 97 in the roller pin hole 96. The rollers 98 can slidably engage the slots 126 formed in the long sidewalls 124 of the corresponding slotted channel 120 and can extend into the slots 126. The second end 95 and at least a part of the extension 94 can extend into the channel cavity 122 and are able to move inside the channel cavity 122 as the door 130 opens and closes. The gap between the arm and the channel cavity 94 should be sufficiently large as to not restrict rotation of the second end 95 inside the channel cavity 122, but small enough to minimize movement of the arm 90 along the tube 60. Thus, the engagement with the arm 90 in the slotted channel 120 can minimize axial movement of the arm 90 with the tube 60.

The materials of the components of the motorized door assembly can be made of a high strength lightweight material. For example, the housing 20, support brackets 30, 40, pivot bar 110, and frame 100 can be made from a metal material, such as thin metal sheets. The roller support 80 and the crown 71 of the gudgeon 70 can be made of high density plastic. The spindle 74 of the gudgeon 70 can be made from a metal material, such as steel or aluminum. The arms 90 and slotted channels 120 can be machined from hard plastic, such as ABS. The roller pins 97 can be made from a high strength metal material, such as stainless steel. The rollers 98 can be made of a soft metal material, such copper or brass. The tube 60 can be made of a metal material, such as galvanized steel.

Figure 10:
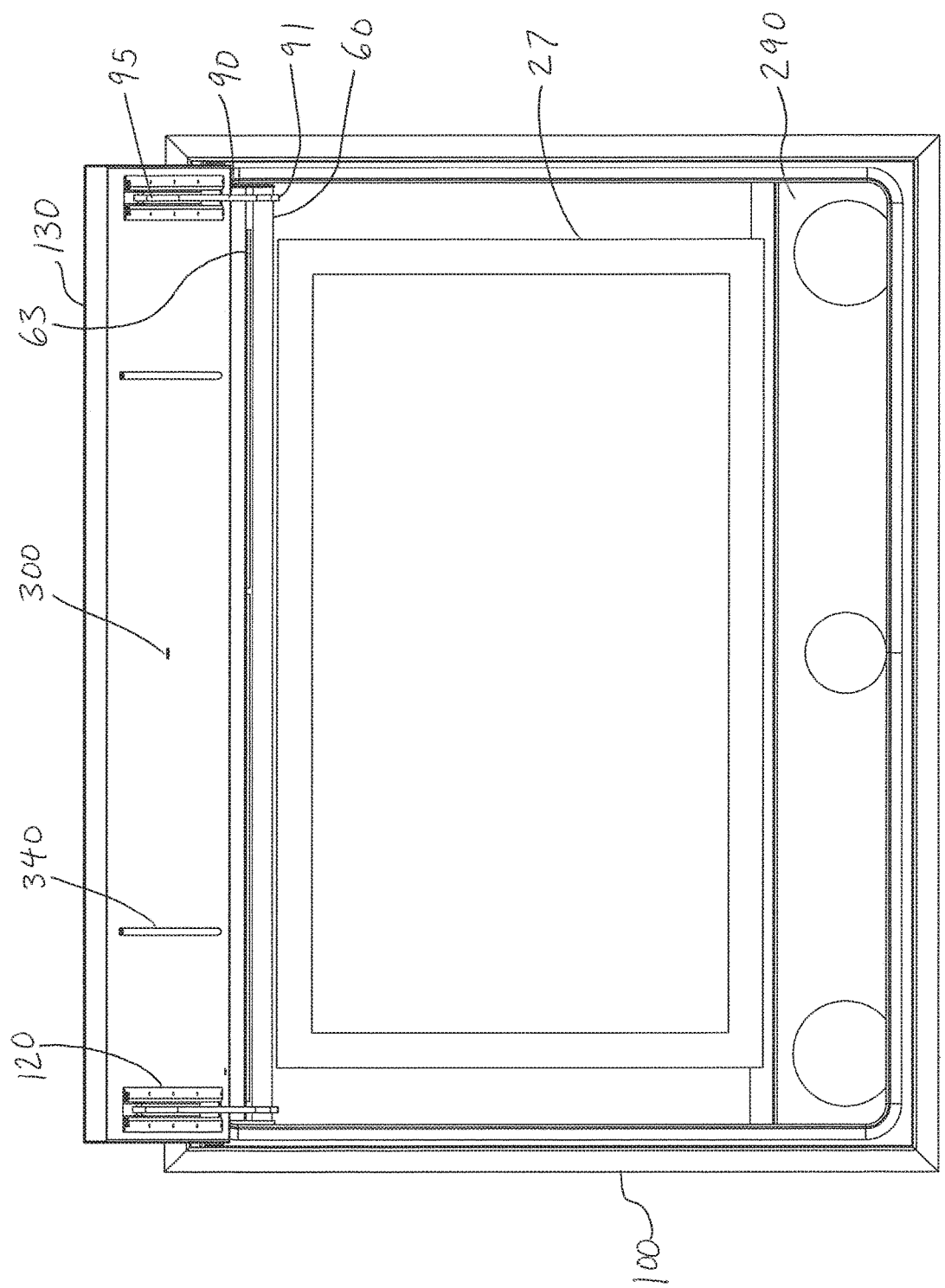
FIG. 10 is a front view of the motorized door assembly of FIG. 1 shown in an open position.

Referring now to FIG. 10, when the motor adapter 53 rotates the tube 60 in the door opening direction to reveal the display device 27, the tube 60 rotates the arm 90 thereby rotating the arm 90 outwardly from inside the housing cavity 21 and the frame cavity 101. The second end 95 of the arm 90 presses against the door 130 as the arm 90 rotates outwardly, by pressing against the slots 126 via the rollers 98. Because the rotation axis of the tube 60 and the arms 90 is different than the rotation axis of the door 130, which rotates about the openings of ears 112 of the pivot bar 110, as the arm 90 rotates outwardly, the rollers 98 slide along the slots 126 of the slotted channels 120 to prevent the door 130 from binding. When the door 130 is fully opened or opened to a desired angle, power to the motor 50 can cease. When the door 130 is to be closed, power can be supplied to the motor 50 to rotate the tube 60 in the door closing direction thereby rotating the arm 90 into the housing cavity 21 until the door 130 is fully closed at the desired angle.

The motor adapter 53 can be controlled remotely or directly by a switch, such as a remote wall switch or key, or a switch or key directly on the motorized door assembly 10. Once a desired position is reached, such as in a fully open position, power to the motor 50 can be cut. After power to the motor 50 is cut, brakes on the motor 50 may hold the tube 60 in any position thereby preventing the tube 60 from rotating in the unwinding direction from the weight of the door 130 under gravity. Thus, the degree of opening of the door 130 can be controlled by operation of the motor 50. A seal 155 (FIG. 3) may be provided along the frame bottom 103 to prevent moisture and debris from entering into the housing cavity 21 when the door 130 is fully closed.

Methods of making and of using the motorized door assemblies and their components discussed elsewhere herein are understood to fall within the scope of the present disclosure.

Although limited embodiments of motorized door assemblies and their components have been specifically described and illustrated herein, many modifications and variations will be apparent to those skilled in the art. For example, the various housings, doors, arms, motors, channels, cutouts, pockets, voids, and frame materials may differ than as described while still serves the purpose of providing a door for concealing components inside the housing. Furthermore, it is understood and contemplated that features specifically discussed for one motorized door assembly embodiment may be adopted for inclusion with another motorized door assembly embodiment, provided the functions are compatible. Accordingly, it is to be understood that the motorized door assemblies and their components constructed according to principles of the disclosed device, system, and method may be embodied other than as specifically described herein. The disclosure is also defined in the following claims.

The invention claimed is:

1. A motorized door assembly for a recreational vehicle, comprising:
    a housing having a housing body with four sidewalls defining a housing opening for accessing a housing cavity, the housing cavity being sized and shaped to accommodate one or more components therein;
    a frame comprising four frame sides and a flange fitted over the housing opening with the four frame sides positioned snugly against or adjacent the four sidewalls of the housing;
    a door having an exterior surface and an interior surface facing the housing cavity when the door is in a door closed position, said door being rotatable relative to the housing about a door pivot axis, the door covering the housing opening and concealing the housing cavity in the door closed position and revealing the housing cavity in a door open position;

a motor comprising a motor head fixed to the housing and a motor adapter rotatably coupled to the motor head about a motor rotation axis, the motor rotation axis and the door pivot axis being offset from one another; and an arm coupled to the door and the motor.

2. The motorized door assembly of claim 1, wherein the door is rotatable about the pivot axis when the motor adapter rotates.

3. The motorized door assembly of claim 2, wherein the arm pushes the door open when the motor adapter rotates in a door opening direction.

4. The motorized door assembly of claim 3, wherein the arm has a first end coupled to the motor adapter and a second end slidably coupled to the door.

5. The motorized door assembly of claim 4, wherein the second end of the arm has a roller engaged in a slot formed in the door.

6. The motorized door assembly of claim 5, wherein the second end extends into the door.

7. The motorized door assembly of claim 4, wherein the first end of the arm defines at least a partial bore extending through the first end, and a tube extends through the at least partial bore of the first end.

8. The motorized door assembly of claim 7, wherein a pin extends radially inwardly from the bore of the first end and engages in a longitudinal slot extending across the outer surface of the length of the tube.

9. The motorized door assembly of claim 3, wherein the door is rotatably coupled to the frame.

10. The motorized door assembly of claim 9, further comprising one or more pivot brackets attached to the frame, the door being rotatably coupled to the one or more pivot brackets.

11. The motorized door assembly of claim 10, wherein the housing is attached to a skin or panel of a recreational vehicle (RV).

12. The motorized door assembly of claim 1, wherein the door comprises a first component attached to a second component to cooperatively define an interior space, and a center insert received in the interior space.

13. The motorized door assembly of claim 9, wherein a seal is formed around a bottom surface of the frame, the seal engages the door in the door closed position.

14. The motorized door assembly of claim 1, further comprising an infrared sensor mounted to the door to stop the door if a person is within a predetermined distance from the door.

15. The method of forming a motorized door assembly for a recreational vehicle, the method comprising:

providing a housing having a housing body with four sidewalls defining a housing opening for accessing a housing cavity and a frame comprising four frame sides and a flange fitted over the housing opening with the four frame sides positioned snugly against or adjacent the four sidewalls of the housing, the housing cavity being sized and shaped to accommodate one or more components therein;

rotatably coupling a door to the housing about a door pivot axis, the door having an exterior surface and an interior surface facing the housing cavity in the door closed position;

positioning a motor inside the housing cavity, the motor comprising a motor head fixed to the housing and a motor adapter rotatably coupled to the motor head about a motor rotation axis offset from the pivot axis; and coupling a first end of an arm to the motor and a second end of the arm to the door.

* * * * *